US009674467B2

(12) United States Patent
Izawa et al.

(10) Patent No.: US 9,674,467 B2
(45) Date of Patent: Jun. 6, 2017

(54) IMAGE PROCESSING DEVICE, IMAGING DEVICE, IMAGE PROCESSING METHOD, AND IMAGE PROCESSING PROGRAM

(71) Applicant: FUJIFILM Corporation, Tokyo (JP)

(72) Inventors: Katsutoshi Izawa, Saitama (JP); Junji Hayashi, Saitama (JP); Tomoyuki Kawai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/064,017

(22) Filed: Mar. 8, 2016

(65) Prior Publication Data

US 2016/0191824 A1 Jun. 30, 2016

Related U.S. Application Data

(63) Continuation of application No. PCT/JP2014/073458, filed on Sep. 5, 2014.

(30) Foreign Application Priority Data

Sep. 27, 2013 (JP) ................................ 2013-202363

(51) Int. Cl.
| | |
|---|---|
| *H04N 9/64* | (2006.01) |
| *H04N 5/232* | (2006.01) |
| *H04N 5/357* | (2011.01) |
| *G02B 7/34* | (2006.01) |
| *H04N 5/225* | (2006.01) |

(Continued)

(52) U.S. Cl.
CPC ............. *H04N 5/3572* (2013.01); *G02B 7/34* (2013.01); *G03B 13/36* (2013.01); *G06K 9/6202* (2013.01);

(Continued)

(58) Field of Classification Search
CPC .. H04N 5/3572; H04N 5/2175; H04N 3/1568; H04N 5/357; H04N 1/409;

(Continued)

(56) References Cited

U.S. PATENT DOCUMENTS

2002/0094131 A1 * 7/2002 Shirakawa ......... H04N 5/23209
  382/274
2009/0153693 A1 6/2009 Onuki et al.
(Continued)

FOREIGN PATENT DOCUMENTS

| JP | 2009-147665 A | 7/2009 |
|---|---|---|
| WO | WO 2012/039346 A1 | 3/2012 |

OTHER PUBLICATIONS

International Search Report for PCT/JP2014/073458 (PCT/ISA/210) mailed on Dec. 2, 2014.
(Continued)

*Primary Examiner* — Kelly L Jerabek
(74) *Attorney, Agent, or Firm* — Birch, Stewart, Kolasch & Birch, LLP

(57) ABSTRACT

The invention provides an image processing device, an imaging device, an image processing method, and a non-transitory computer readable recording medium recorded with an image processing program that can instantaneously correct shading characteristics. A correction unit calculates a shading characteristic correction coefficient based on a first comparison result and a second comparison result and corrects the shading characteristics of a subsequent frame based on the calculated coefficient. The first comparison result indicates the result of the comparison between a phase difference image and a normal image included in a preceding frame acquired first a pair of frames acquired at different times. The second comparison result indicates the result of the comparison between a phase difference image and a normal image included in the subsequent frame. A control unit directs a display device to continuously display the subsequent frame, of which the shading characteristics have been corrected, as a moving image.

20 Claims, 20 Drawing Sheets

(51) Int. Cl.
   *H04N 5/369*   (2011.01)
   *G03B 13/36*   (2006.01)
   *G06K 9/62*    (2006.01)
   *H04N 9/04*    (2006.01)
   *G03B 13/00*   (2006.01)
   *G03B 13/28*   (2006.01)

(52) U.S. Cl.
   CPC ....... *H04N 5/2254* (2013.01); *H04N 5/23212* (2013.01); *H04N 5/23245* (2013.01); *H04N 5/3696* (2013.01); *H04N 9/045* (2013.01); *G03B 13/28* (2013.01)

(58) Field of Classification Search
   CPC ........ G06T 5/002; G03B 13/00; G03B 17/18; G02B 7/34; G02B 7/346
   USPC ...... 348/345–346, 349, 353, 333.02, 333.05, 348/333.11, 241, 251
   See application file for complete search history.

(56) References Cited

U.S. PATENT DOCUMENTS

| | | | |
|---|---|---|---|
| 2011/0019028 A1* | 1/2011 | Kimijima | G02B 7/34 348/222.1 |
| 2011/0234861 A1* | 9/2011 | Endo | H04N 5/3572 348/243 |
| 2013/0162780 A1 | 6/2013 | Kurahashi | |
| 2013/0278730 A1* | 10/2013 | Hasegawa | G03B 35/08 348/49 |

OTHER PUBLICATIONS

Written Opinion of the International Searching Authority for PCT/JP2014/073458 (PCT/ISA/237) mailed on Dec. 2, 2014.
Englsih translation of International Preliminary Report on Patentability for PCT/JP2014/073458 (PCT/IB/373), dated Mar. 29, 2016.

* cited by examiner

FIG. 14
BEFORE CORRECTION
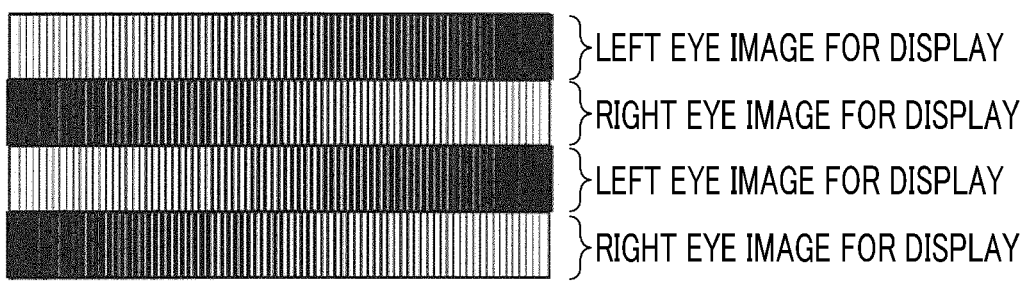
} LEFT EYE IMAGE FOR DISPLAY
} RIGHT EYE IMAGE FOR DISPLAY
} LEFT EYE IMAGE FOR DISPLAY
} RIGHT EYE IMAGE FOR DISPLAY
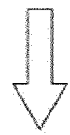
AFTER CORRECTION
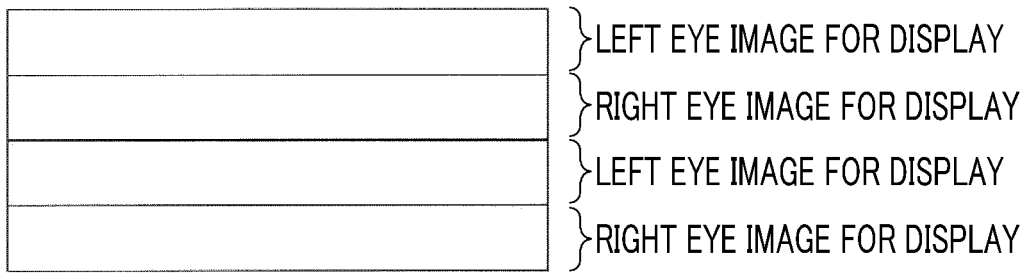
} LEFT EYE IMAGE FOR DISPLAY
} RIGHT EYE IMAGE FOR DISPLAY
} LEFT EYE IMAGE FOR DISPLAY
} RIGHT EYE IMAGE FOR DISPLAY L  LEFT EYE IMAGE  RIGHT EYE IMAGE
   CORRECTION      CORRECTION
   COEFFICIENT     COEFFICIENT

IMAGE PROCESSING DEVICE, IMAGING DEVICE, IMAGE PROCESSING METHOD, AND IMAGE PROCESSING PROGRAM

CROSS-REFERENCE TO RELATED APPLICATIONS

This application is a Continuation of PCT International Application No. PCT/JP2014/073458 filed on Sep. 5, 2014, which claims priority under 35 U.S.C §119(a) to Japanese Patent Application No. 2013-202363 filed on Sep. 27, 2013. Each of the above application(s) is hereby expressly incorporated by reference, in its entirety, into the present application.

BACKGROUND OF THE INVENTION

1. Field of the Invention

The present invention relates to an image processing device, an imaging device, an image processing method, and a non-transitory computer readable recording medium recorded with an image processing program.

2. Description of the Related Art

Digital cameras which have a so-called manual focus mode that enables the user to manually adjust focus, in addition to an automatic focus mode using a phase difference detection method or a contrast detection method, is widely known.

As a digital camera having the manual focus mode, a digital camera is known which is provided with a reflex mirror such that the user can adjust focus while checking an object and uses a split microprism screen on which a phase difference is visually displayed. In addition, a digital camera using a method which visually checks contrast is known.

However, in a digital camera without a reflex mirror which has recently come into widespread use, since a reflex mirror is not provided, there is no way to check an object image while displaying a phase difference and there is no choice but to use the contrast detection method. However, in this case, it is difficult to display an image with a contrast that is equal to or greater than the resolution of a display device, such as a liquid crystal display (LCD). As a result, there is no choice but to use a method which partially enlarges an image or the like and displays the image.

In recent years, a split image has been displayed in a live view image (also referred to as a through image) in order to make it easy for the user (for example, the photographer) to focus the camera on the object in the manual focus mode. The split image indicates, for example, a divided image of which the display region is divided into a plurality of regions (for example, each of the images which are divided in the up-down direction) and which deviates in a direction in which parallax occurs (for example, the left-right direction) depending on the amount of defocus. When an image is in focus, the deviation of the split image in the direction in which parallax occurs is removed. The user operates a manual focus ring (hereinafter, referred to as a "focus ring") to focus the camera on the object such that the deviation of the split image (for example, each of the images which are divided in the up-down direction) is removed.

Here, the principle of the split image will be described with reference to the imaging device disclosed in JP2009-147665A. The imaging device disclosed in JP2009-147665A generates a so-called right eye image and a so-called left eye image from an object image which passes through a pair of regions of an imaging lens, is pupil-divided, and is formed. Then, the imaging device generates a split image using the right eye image and the left eye image, and generates a normal image from an object image which passes through the imaging lens, without being pupil-divided, and is formed. Then, the imaging device displays the normal image on a display unit and displays the split image in the normal image.

However, since the center of a light flux which passes through the pair of regions of the imaging lens deviates from the optical axis of the lens, linear shading characteristics appear in the right eye image and the left eye image in each direction along a pupil division direction.

WO2012/039346A discloses a technique for correcting the shading characteristics. The imaging device disclosed in WO2012/039346A compares a pixel value included in a normal image with pixel values included in a right eye image and a left eye image, creates a correction table, and corrects the shading characteristics using the created correction table.

SUMMARY OF THE INVENTION

However, since the shading characteristics depend on imaging conditions, such as the lens or aperture value of the imaging device, a correction table needs to be created for each imaging condition in the technique disclosed in WO2012/039346A and it is difficult to instantaneously correct the shading characteristics when the imaging conditions change.

The invention has been made in view of the above-mentioned problems and an object of the invention is to provide an image processing device, an imaging device, an image processing method, and a non-transitory computer readable recording medium recorded with an image processing program which can instantaneously correct the shading characteristics.

In order to achieve the object, according to a first aspect of the invention, there is provided an image processing device including: an acquisition unit that acquires a captured image including a first image based on a first image signal, which is obtained from an object image that passes through a pair of regions of an imaging lens, is pupil-divided, and is formed, and a second image based on a second image signal corresponding to an image signal, which is obtained from an object image that passes through the imaging lens, without being pupil-divided, and is formed, the first image signal and the second image signal being output from an imaging element including a phase difference pixel group that outputs the first image signal; a correction unit that calculates a shading characteristic correction coefficient on the basis of a first comparison result between the first image and the second image included in an early-acquired image which is acquired first of a pair of captured images acquired at different times by the acquisition unit and a second comparison result between the first image and the second image included in a late-acquired image which is acquired later than the early-acquired image of the pair of captured images, and corrects shading characteristics of the late-acquired image on the basis of the calculated shading characteristic correction coefficient; a display unit that displays an image; and a control unit that directs the display unit to continuously display the second image included in the early-acquired image and the second image included in the late-acquired image, of which the shading characteristics have been corrected by the correction unit, as a moving image, and to display an image based on the first image included in the early-acquired image and an image based on the first image included in the late-acquired image, of which the shading characteristics have been corrected by the correction unit, as a moving image for checking a focus in a display region of the second image. According to this structure, the image processing device can instantaneously correct the shading characteristics, as compared to a case without the structure in which the shading characteristics are corrected using the shading characteristic correction coefficient which is calculated on the basis of the first comparison result and the second comparison result.

In order to achieve the object, according to a second aspect of the invention, there is provided an image processing device including: an acquisition unit that acquires a captured image including a first image based on a first image signal, which is obtained from an object image that passes through a pair of regions of an imaging lens, is pupil-divided, and is formed, and a second image based on a second image signal corresponding to an image signal, which is obtained from an object image that passes through the imaging lens, without being pupil-divided, and is formed, the first image signal and the second image signal being output from an imaging element including a phase difference pixel group that outputs the first image signal; a correction unit that calculates a shading characteristic correction coefficient on the basis of a first comparison result between the first image and the second image included in an early-acquired image which is acquired first of a pair of captured images acquired at different times by the acquisition unit and a second comparison result between the first image and the second image included in a late-acquired image which is acquired later than the early-acquired image of the pair of captured images, and corrects shading characteristics of the late-acquired image on the basis of the calculated shading characteristic correction coefficient; a display unit that displays an image; and a control unit that directs the display unit to continuously display an image based on the first image included in the early-acquired image and an image based on the first image included in the late-acquired image, of which the shading characteristics have been corrected by the correction unit, as a moving image for checking a focus. According to this structure, the image processing device can instantaneously correct the shading characteristics, as compared to a case without the structure in which the shading characteristics are corrected using an averaging correction coefficient which is calculated on the basis of the first comparison result and the second comparison result.

According to a third aspect of the invention, in the image processing device according to the first or second aspect, the shading characteristic correction coefficient may be obtained by averaging the first comparison result and the second comparison result. According to this structure, the image processing device can obtain the shading characteristic correction coefficient corresponding to the current imaging conditions, as compared to a case in which the value obtained by averaging the first comparison result and the second comparison result is not used as the shading characteristic correction coefficient.

According to a fourth aspect of the invention, in the image processing device according to the third aspect, the shading characteristic correction coefficient may be obtained by averaging the first comparison result to which a first weight is given and the second comparison result to which a second weight that is less than the first weight is given. According to this structure, the image processing device can improve the accuracy of correcting the shading characteristics, as compared to a case in which the value obtained by averaging the first comparison result to which the first weight is given and the second comparison result to which the second weight that is less than the first weight is given is not used as the shading characteristic correction coefficient.

According to a fifth aspect of the invention, in the image processing device according to the third aspect, the shading characteristic correction coefficient may be obtained by averaging the first comparison result to which a first weight is given and the second comparison result to which a second weight that is equal to or greater than the first weight is given. According to this structure, the image processing device can reduce the time required to correct the shading characteristics, as compared to a case in which the value obtained by averaging the first comparison result to which the first weight is given and the second comparison result to which the second weight that is equal to or greater than the first weight is given is not used as the shading characteristic correction coefficient.

According to a sixth aspect of the invention, in the image processing device according to any one of the first to third aspects, the first comparison result may be a value that is based on a first comparison value between pixel values of the first image and the second image included in the early-acquired image at corresponding pixel positions, and the second comparison result may be a value that is based on a second comparison value between pixel values of the first image and the second image included in the late-acquired image at corresponding pixel positions. According to this structure, the image processing device can obtain the shading characteristic correction coefficient that enables the brightness of each pixel of the image, of which the shading characteristics have been corrected, to correspond to the brightness of each pixel of the second image, as compared to a case without the above-mentioned structure.

According to a seventh aspect of the invention, in the image processing device according to the sixth aspect, the shading characteristic correction coefficient may be obtained on the basis of a value which is based on the first comparison values except for at least one of a minimum value or a maximum value among the first comparison values and a value which is based on the second comparison values except for at least one of a minimum value or a maximum value among the second comparison values at every three or more pixel positions of the imaging element in a pupil division direction. According to this structure, the image processing device can obtain the shading characteristic correction coefficient that is smoothed with high accuracy, as compared to a case without the above-mentioned structure.

According to an eighth aspect of the invention, in the image processing device according to the sixth aspect, in case in which the second comparison value is greater than an upper limit, the correction unit may change the second comparison value greater than the upper limit to a value that corresponds to the first comparison value at a pixel position corresponding to the pixel position at which the second comparison value greater than the upper limit is obtained. In case in which the second comparison value is less than a lower limit, the correction unit may change the second comparison value less than the lower limit to a value that corresponds to the first comparison value at a pixel position corresponding to the pixel position at which the second comparison value less than the lower limit is obtained. According to this structure, the image processing device can obtain the shading characteristic correction coefficient that is smoothed with high accuracy, as compared to a case without the above-mentioned structure.

According to a ninth aspect of the invention, in the image processing device according to any one of the sixth to eighth aspects, the imaging element may have sensitivity to colors which are allocated to each pixel. The first comparison value may be a comparison value between the pixel values of the first image and the second image included in the early-acquired image at the corresponding pixel positions having sensitivity to the same color. The second comparison value may be a comparison value between the pixel values of the first image and the second image included in the late-acquired image at the corresponding pixel positions having sensitivity to the same color. According to this structure, the image processing device can correct the shading characteristics with high accuracy even when pixels have different sensitivities to colors, as compared to a case without the above-mentioned structure..

According to a tenth aspect of the invention, in the image processing device according to any one of the first to ninth aspects, the imaging element may include a pixel group that outputs an image signal obtained from the object image, which passes through the imaging lens, without being pupil-divided, and is formed, as the second image signal. According to this structure, the image processing device can improve image quality, as compared to a structure without the imaging element including the pixel group that outputs the image signal obtained from the object image, which passes through the imaging lens, without being pupil-divided, and is formed, as the second image signal.

According to an eleventh aspect of the invention, there is provided an imaging device including: the image processing device according to any one of the first to tenth aspects; an imaging element including the phase difference pixel group; and a storage unit that stores an image which is generated on the basis of a signal output from the imaging element. According to this structure, the imaging device can instantaneously correct the shading characteristics, as compared to a case without the structure in which the shading characteristics are corrected using the shading characteristic correction coefficient which is calculated on the basis of the first comparison result and the second comparison result.

According to a twelfth aspect of the invention, there is provided an image processing method including: acquiring a captured image including a first image based on a first image signal, which is obtained from an object image that passes through a pair of regions of an imaging lens, is pupil-divided, and is formed, and a second image based on a second image signal corresponding to an image signal, which is obtained from an object image that passes through the imaging lens, without being pupil-divided, and is formed, the first image signal and the second image signal being output from an imaging element including a phase difference pixel group that outputs the first image signal; calculating a shading characteristic correction coefficient on the basis of a first comparison result between the first image and the second image included in an early-acquired image which is acquired first of a pair of captured images acquired at different times and a second comparison result between the first image and the second image included in a late-acquired image which is acquired later than the early-acquired image of the pair of captured images; correcting shading characteristics of the late-acquired image on the basis of the calculated shading characteristic correction coefficient; and directing a display unit that displays an image to continuously display the second image included in the early-acquired image and the second image included in the late-acquired image, of which the shading characteristics have been corrected, as a moving image, and to continuously display an image based on the first image included in the early-acquired image and an image based on the first image included in the late-acquired image, of which the shading characteristics have been corrected, as a moving image for checking a focus in a display region of the second image. According to this structure, the image processing method according to the twelfth aspect of the invention can instantaneously correct the shading characteristics, as compared to a case without the structure in which the shading characteristics are corrected using the shading characteristic correction coefficient which is calculated on the basis of the first comparison result and the second comparison result.

According to a thirteenth aspect of the invention, there is provided an image processing method including: acquiring a captured image including a first image based on a first image signal, which is obtained from an object image that passes through a pair of regions of an imaging lens, is pupil-divided, and is formed, and a second image based on a second image signal corresponding to an image signal, which is obtained from an object image that passes through the imaging lens, without being pupil-divided, and is formed, the first image signal and the second image signal being output from an imaging element including a phase difference pixel group that outputs the first image signal; calculating a shading characteristic correction coefficient on the basis of a first comparison result between the first image and the second image included in an early-acquired image which is acquired first of a pair of captured images acquired at different times and a second comparison result between the first image and the second image included in a late-acquired image which is acquired later than the early-acquired image of the pair of captured images; correcting shading characteristics of the late-acquired image on the basis of the calculated shading characteristic correction coefficient; and directing a display unit that displays an image to continuously display an image based on the first image included in the early-acquired image and an image based on the first image included in the late-acquired image, of which the shading characteristics have been corrected, as a moving image for checking a focus. According to this structure, the image processing method according to the thirteenth aspect of the invention can instantaneously correct the shading characteristics, as compared to a case without the structure in which the shading characteristics are corrected using the shading characteristic correction coefficient which is calculated on the basis of the first comparison result and the second comparison result.

According to a fourteenth aspect of the invention, there is provided a non-transitory computer readable recording medium recorded with an image processing program that causes a computer to function as the image processing device including: acquiring a captured image including a first image based on a first image signal, which is obtained from an object image that passes through a pair of regions of an imaging lens, is pupil-divided, and is formed, and a second image based on a second image signal corresponding to an image signal, which is obtained from an object image that passes through the imaging lens, without being pupil-divided, and is formed, the first image signal and the second image signal being output from an imaging element including a phase difference pixel group that outputs the first image signal; calculating a shading characteristic correction coefficient on the basis of a first comparison result between the first image and the second image included in an early-acquired image which is acquired first of a pair of captured images acquired at different times and a second comparison result between the first image and the second image included in a late-acquired image which is acquired later than the early-acquired image of the pair of captured images; correcting shading characteristics of the late-acquired image on the basis of the calculated shading characteristic correction coefficient; and directing a display unit that displays an image to continuously display the second image included in the early-acquired image and the second image included in the late-acquired image, of which the shading characteristics have been corrected, as a moving image, and to continuously display an image based on the first image included in the early-acquired image and an image based on the first image included in the late-acquired image, of which the shading characteristics have been corrected, as a moving image for checking a focus in a display region of the second image. According to this structure, the non-transitory computer readable recording medium recorded with the image processing program can instantaneously correct the shading characteristics, as compared to a case without the structure in which the shading characteristics are corrected using the shading characteristic correction coefficient which is calculated on the basis of the first comparison result and the second comparison result.

According to a fifteenth aspect of the invention, there is provided a non-transitory computer readable recording medium recorded with an image processing program that causes a computer to function as the image processing device including: acquiring a captured image including a first image based on a first image signal, which is obtained from an object image that passes through a pair of regions of an imaging lens, is pupil-divided, and is formed, and a second image based on a second image signal corresponding to an image signal, which is obtained from an object image that passes through the imaging lens, without being pupil-divided, and is formed, the first image signal and the second image signal being output from an imaging element including a phase difference pixel group that outputs the first image signal; calculating a shading characteristic correction coefficient on the basis of a first comparison result between the first image and the second image included in an early-acquired image which is acquired first of a pair of captured images acquired at different times and a second comparison result between the first image and the second image included in a late-acquired image which is acquired later than the early-acquired image of the pair of captured images; correcting shading characteristics of the late-acquired image on the basis of the calculated shading characteristic correction coefficient; and directing a display unit that displays an image to continuously display an image based on the first image included in the early-acquired image and an image based on the first image included in the late-acquired image, of which the shading characteristics have been corrected, as a moving image for checking a focus. According to this structure, the non-transitory computer readable recording medium recorded with the image processing program can instantaneously correct the shading characteristics, as compared to a case without the structure in which the shading characteristics are corrected using the shading characteristic correction coefficient which is calculated on the basis of the first comparison result and the second comparison result.

According to the invention, it is possible to instantaneously correct the shading characteristics.

BRIEF DESCRIPTION OF THE DRAWINGS

FIG. 14 is a conceptual diagram illustrating an example of the influence of the shading characteristics on a left eye image for display and a right eye image for display before and after correction.

DESCRIPTION OF THE PREFERRED EMBODIMENTS

Hereinafter, examples of embodiments of an imaging device according to the invention will be described with reference to the accompanying drawings.

First Embodiment

Figure 1:
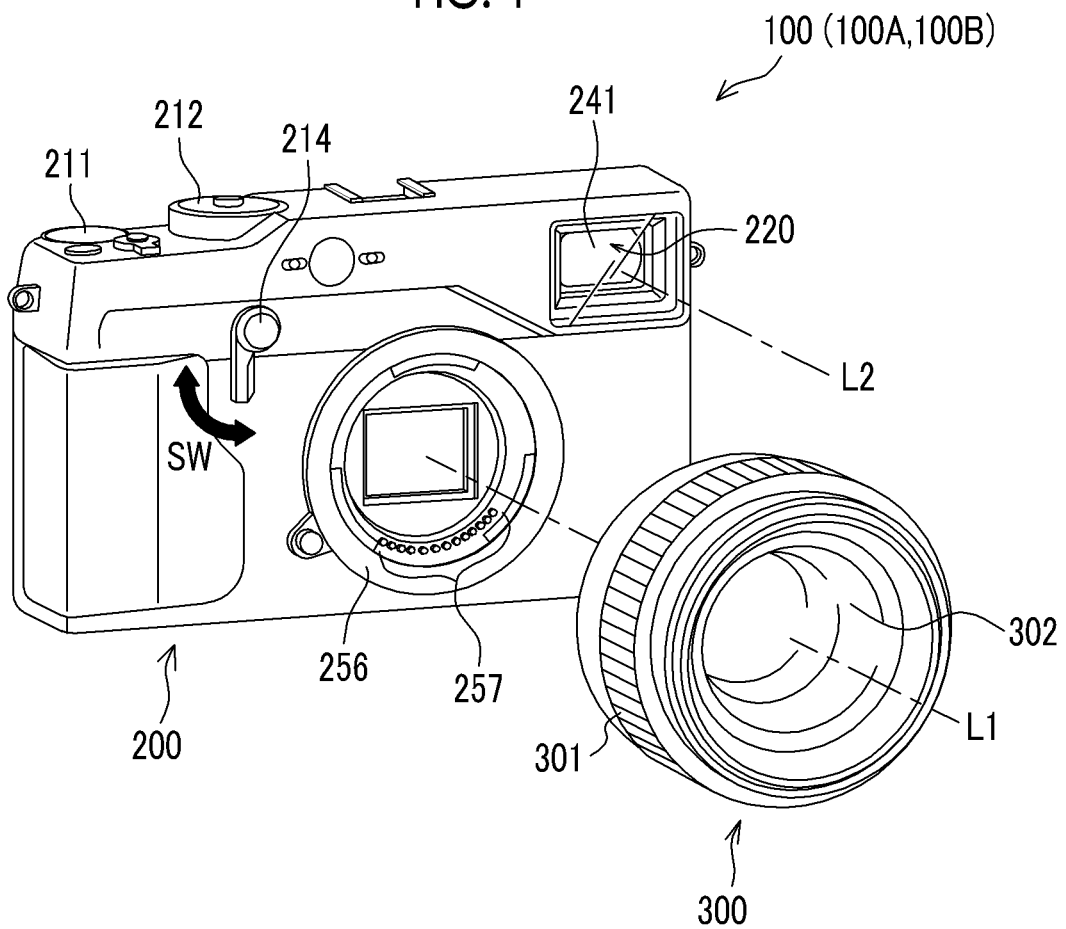
FIG. 1 is a perspective view illustrating an example of the outward appearance of an imaging device which is an interchangeable lens camera according to first to third embodiments.
Figure 2:
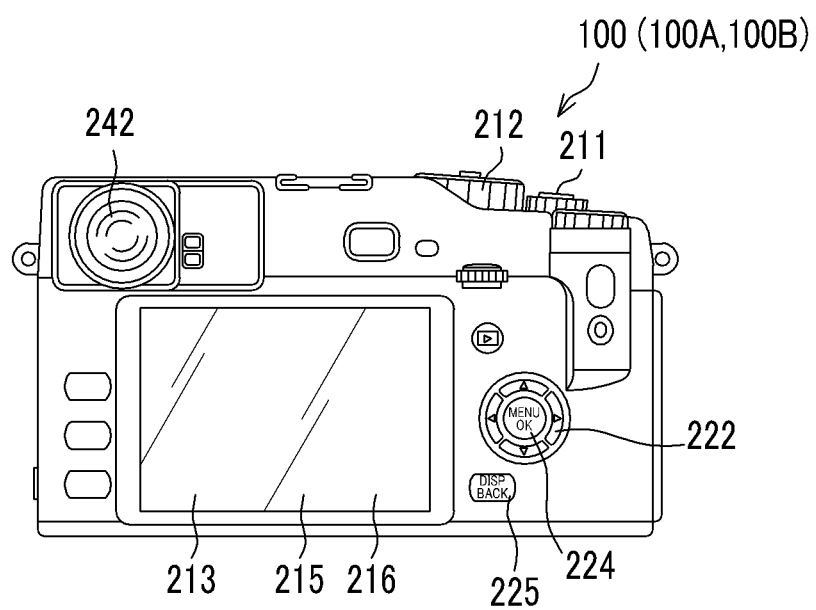
FIG. 2 is a rear view illustrating the rear surface side of the imaging device according to the first to third embodiments.

FIG. 1 is a perspective view illustrating an example of the outward appearance of an imaging device 100 according to a first embodiment. FIG. 2 is a rear view illustrating the imaging device 100 illustrated in FIG. 1.

The imaging device 100 is an interchangeable lens camera. The imaging device 100 is a digital camera that includes an imaging device body 200 and an interchangeable lens 300 which is interchangeably mounted on the imaging device body 200, and does not include a reflex mirror. The interchangeable lens 300 includes an imaging lens 16 (see FIG. 3) having a focus lens 302 that can be moved in an optical axis direction by a manual operation. In addition, imaging device body 200 includes a hybrid finder (registered trademark) 220. The hybrid finder 220 means, for example, a finder in which an optical viewfinder (hereinafter, referred to as an "OVF") and an electronic viewfinder (hereinafter, referred to as an "EVF") are selectively used.

The interchangeable lens 300 is interchangeably mounted on the imaging device body 200. In addition, a focus ring 301 which is used in a manual focus mode is provided in a lens barrel of the interchangeable lens 300. The focus lens 302 is moved in the optical axis direction with the rotation of the focus ring 301 by a manual operation to focus object light on an imaging element 20 (see FIG. 3), which will be described below, at an in-focus position corresponding to the distance to the object.

A finder window 241 of the OVF included in the hybrid finder 220 is provided on the front surface of the imaging device body 200. In addition, a finder switching lever (finder switching unit) 214 is provided on the front surface of the imaging device body 200. When the finder switching lever 214 is rotated in the direction of an arrow SW, an image is switched between an optical image which can be viewed through the OVF and an electronic image (live view image) which can be viewed through the EVF (which will be described below). Further, an optical axis L2 of the OVF is different from an optical axis L1 of the interchangeable lens 300. Furthermore, a release button 211 and a dial 212 for setting, for example, an imaging mode or a reproduction mode are generally provided on an upper surface of the imaging device body 200.

The release button 211 serving as an imaging preparation instruction unit and an imaging instruction unit is configured such that a two-stage pressing operation, that is, an imaging preparation instruction state and an imaging instruction state can be detected. The imaging preparation instruction state means a state in which the release button 211 is pressed from a standby position to an intermediate position (halfway pressed position). The imaging instruction state means a state in which the release button 211 is pressed to a finally pressed position (fully pressed position) through the intermediate position. Hereinafter, the "state in which the release button 211 is pressed from the standby position to the halfway pressed position" is referred to as a "halfway pressed state" and the "state in which the release button 211 is pressed from the standby position to the fully pressed position" is referred to as a "fully pressed state".

In the imaging device 100 according to the first embodiment, the imaging mode and the reproduction mode as the operation modes are selectively set in response to an instruction from the user. In the imaging mode, the manual focus mode and the automatic focus mode are selectively set in response to an instruction from the user. In the automatic focus mode, the state of the release button 211 is changed to the halfway pressed state to adjust imaging conditions, and is then changed to the fully pressed state to perform exposure (imaging). That is, when the release button 211 is pressed halfway, an automatic exposure (AE) function is performed to set an exposure state. Then, an auto-focus (AF) is performed to perform focusing control. When the release button 211 is fully pressed, imaging is performed.

A touch panel display 213, a cross key 222, a MENU/OK key 224, a BACK/DISP button 225, and a finder eyepiece 242 of the OVF are provided on the rear surface of the imaging device body 200 illustrated in FIG. 2.

The touch panel display 213 includes a liquid crystal display (hereinafter, referred to as a "first display") 215 and a touch panel 216.

The first display 215 displays, for example, an image and text information. The first display 215 is used to display a live view image (through image) which is an example of a continuous frame image captured in continuous frames in the imaging mode. In addition, the first display 215 is used to display a still image which is an example of a single frame image that is captured in a single frame in case in which an instruction to capture a still image is issued. The first display 215 is also used to display a reproduction image in the reproduction mode or to display, for example, a menu screen.

The touch panel 216 is a transmissive touch panel and is superimposed on the surface of a display region of the first display 215. The touch panel 216 detects the contact of an indicator (for example, a finger or a stylus pen). The touch panel 216 outputs detection result information indicating the detection result (indicating whether the indicator comes into contact with the touch panel 216) to a predetermined output destination (for example, a CPU 12 (see FIG. 3) which will be described below) in a predetermined cycle (for example, 100 milliseconds). In case in which the touch panel 216 detects the contact of the indicator, the detection result information includes two-dimensional coordinates (hereinafter, referred to as "coordinates") which can specify the contact position on the indicator on the touch panel 216. In case in which the touch panel 216 does not detect the contact of the indicator, the detection result information does not include the coordinates.

The cross key 222 functions as a multi-function key which is used to select one or more menu items and to output various kinds of command signals, such as a zoom signal and a frame advance signal. The MENU/OK key 224 is an operation key having both the function of a menu button for issuing a command to display one or more menus on a screen of the first display 215 and the function of an OK button for issuing a command to confirm and execute the selected content. For example, the BACK/DISP button 225 is used to delete a desired target, such as a selected item, to cancel the designated content, or to return to the previous operation state.

Figure 3:
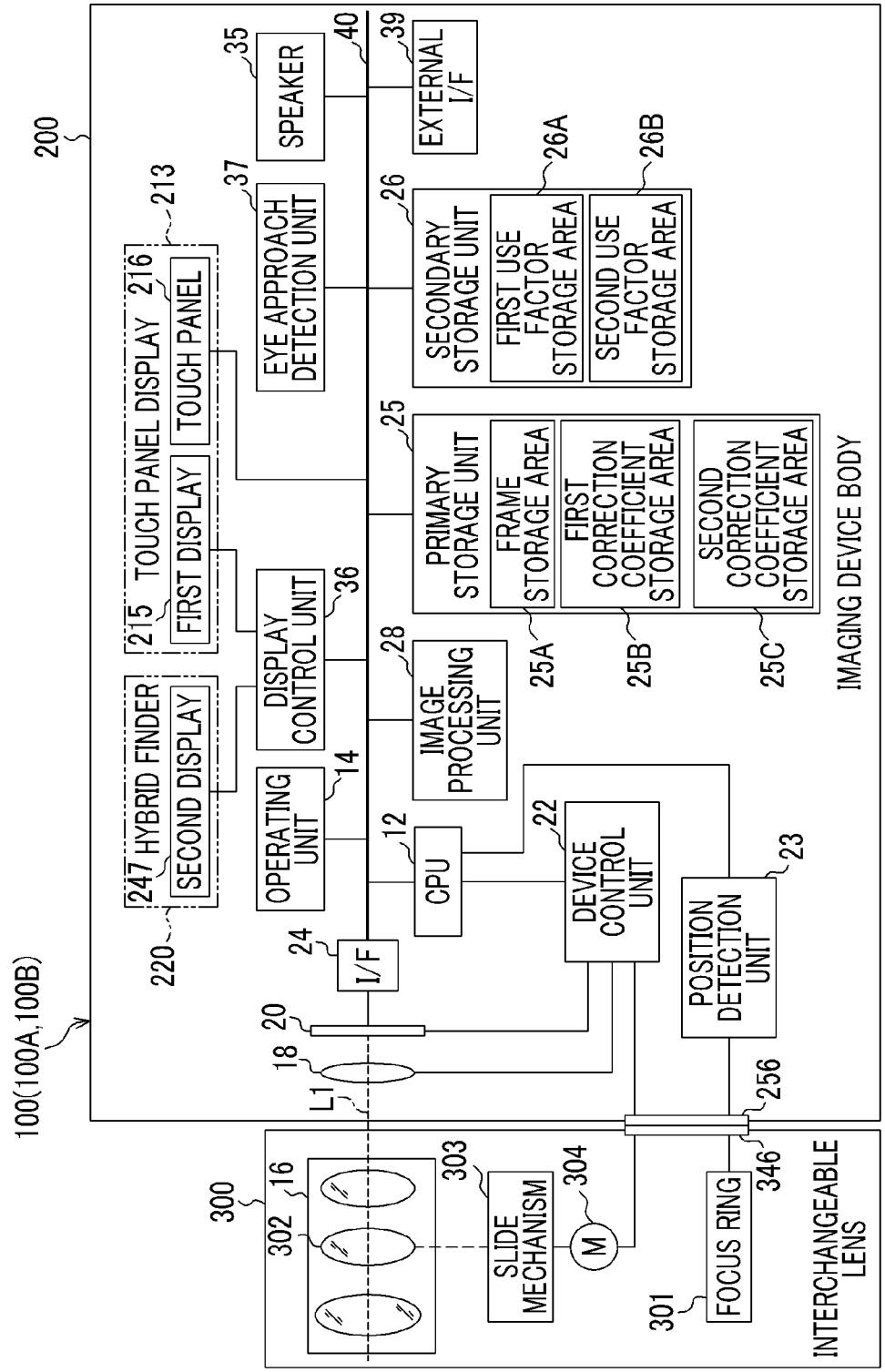
FIG. 3 is a block diagram illustrating an example of the hardware configuration of the imaging device according to the first to third embodiments.

FIG. 3 is an electric system block diagram illustrating an example of the hardware configuration of the imaging device 100 according to the first embodiment.

The imaging device 100 includes a mount 256 which is provided in the imaging device body 200 and a mount 346 which is provided in the interchangeable lens 300 and corresponds to the mount 256. The mount 346 is coupled to the mount 256 such that the interchangeable lens 300 is interchangeably mounted on the imaging device body 200.

The interchangeable lens 300 includes a slide mechanism 303 and a motor 304. The slide mechanism 303 moves the focus lens 302 along the optical axis L1 when the focus ring 301 is operated. The focus lens 302 is attached to the slide mechanism 303 so as to be slidable along the optical axis L1. In addition, the motor 304 is connected to the slide mechanism 303 and the slide mechanism 303 is driven by the motor 304 to slide the focus lens 302 along the optical axis L1.

The motor 304 is connected to the imaging device body 200 through the mounts 256 and 346 and the driving of the motor 304 is controlled in response to a command from the imaging device body 200. In the first embodiment, a stepping motor is applied as an example of the motor 304. The motor 304 is operated in synchronization with pulse power in response to a command from the imaging device body 200. In the example illustrated in FIG. 3, the motor 304 is provided in the interchangeable lens 300. However, the invention is not limited thereto. The motor 304 may be provided in the imaging device body 200.

The imaging device 100 is a digital camera that records captured still images and moving images. The overall operation of the camera is controlled by the central processing unit (CPU) 12. The imaging device 100 includes an operating unit 14, an interface unit 24, a primary storage unit 25, a secondary storage unit 26, a speaker 35, an eye approach detection unit 37, and an external interface (I/F) 39. In addition, the imaging device 100 includes a display control unit 36 which is an example of a display control unit according to the invention. Furthermore, the imaging device 100 includes an image processing unit 28 which is an example of an acquisition unit, a correction unit, and a control unit according to the invention.

The CPU 12, the operating unit 14, the interface unit 24, the primary storage unit 25, the secondary storage unit 26, the image processing unit 28, the speaker 35, the display control unit 36, the eye approach detection unit 37, the external I/F 39, and the touch panel 216 are connected to each other through a bus 40.

The primary storage unit 25 means a volatile memory and is, for example, a random access memory (RAM). The primary storage unit 25 includes a frame storage area 25A, a first correction coefficient storage area 25B, and a second correction coefficient storage area 25C. The frame storage area 25A is a storage area for storing frames which will be described below. The first correction coefficient storage area 25B is a storage area for storing a left eye image correction coefficient which will be described below. The second correction coefficient storage area 25C is a storage area for storing a right eye image correction coefficient which will be described below.

The secondary storage unit 26 means a non-volatile memory and is, for example, a flash memory or a hard disk drive (HDD). The secondary storage unit 26 includes a first use factor storage area 26A and a second use factor storage area 26B. The first use factor storage area 26A is a storage area for storing a first averaging correction coefficient which will be described below and the second use factor storage area 26B is a storage area for storing a second averaging correction coefficient which will be described below.

In the imaging device 100 according to the first embodiment, in the automatic focus mode, the CPU 12 controls the driving of the motor 304 such that the contrast value of a captured image is the maximum to perform focus control. In addition, in the automatic focus mode, the CPU 12 calculates AE information which is a physical amount indicating the brightness of the captured image. When the release button 211 is in the halfway pressed state, the CPU 12 calculates a shutter speed and an F number corresponding to the brightness of the image indicated by the AE information. Then, the CPU 12 controls each related unit such that the shutter speed and the F number become the calculated values to set an exposure state.

The operating unit 14 is a user interface which is operated by the operator to input various instructions to the imaging device 100. The operating unit 14 includes the release button 211, the dial 212 for selecting, for example, the imaging mode, the finder switching lever 214, the cross key 222, the MENU/OK key 224, and the BACK/DISP button 225. Various instructions received by the operating unit 14 are output as operation signals to the CPU 12. The CPU 12 performs processes corresponding to the operation signals input from the operating unit 14.

The imaging device body 200 includes a position detection unit 23. The position detection unit 23 is connected to the CPU 12. The position detection unit 23 is connected to the focus ring 301 through the mounts 256 and 346, detects the rotation angle of the focus ring 301, and outputs rotation angle information indicating the detected rotation angle to the CPU 12. The CPU 12 performs a process corresponding to the rotation angle information input from the position detection unit 23.

When the imaging mode is set, image light indicating the object is focused on a light receiving surface of a color imaging element (for example, a CMOS sensor) 20 through an imaging lens 16 including a focus lens 302 which can be moved by a manual operation and a shutter 18. The signal charge stored in the imaging element 20 is sequentially read as a digital signal corresponding to the signal charge (voltage) by a read signal transmitted from a device control unit 22. The imaging element 20 has a so-called electronic shutter function and performs the electronic shutter function to control the charge storage time (shutter speed) of each photo sensor on the basis of the timing of the read signal. The imaging element 20 according to the first embodiment is a CMOS image sensor, but is not limited thereto. For example, the imaging element 20 may be a CCD image sensor.

Figure 4:
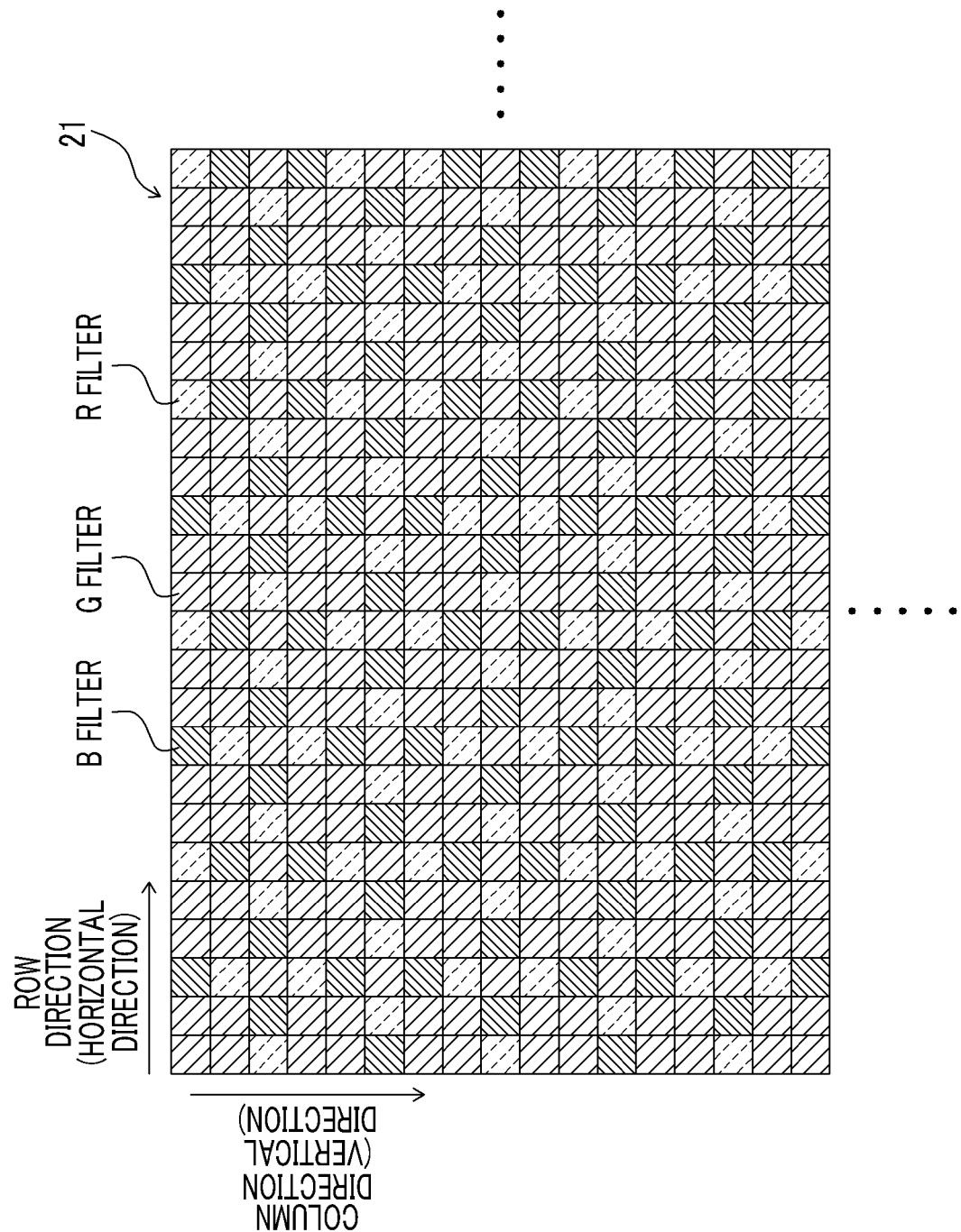
FIG. 4 is a diagram schematically illustrating an example of the structure of color filters provided in an imaging element of the imaging device according to the first to third embodiments.

For example, the imaging element 20 includes a color filter 21 illustrated in FIG. 4. The color filter 21 includes a G filter corresponding to green (G) which most contributes to obtaining a brightness signal, an R filter corresponding to red (R), and a B filter corresponding to blue (B). In the example illustrated in FIG. 5, the imaging element 20 has "4896×3265" pixels. The G filter, the R filter, and the B filter are arranged for each of the pixels so as to have predetermined periodicity in a row direction (horizontal direction) and a column direction (vertical direction). Therefore, when performing a synchronization (interpolation) process for R, and B signals, the imaging device 100 can perform the process according to a repetitive pattern. The synchronization process is a process which calculates the information of all colors for each pixel from a mosaic image corresponding to a color filter array of a single-plate color imaging element. For example, in the case of an imaging element including three color filters, that is, R, and B filters, the synchronization process means a process which calculates the color information of all of R, and B for each pixel from a mosaic image including R, and B.

Figure 5:
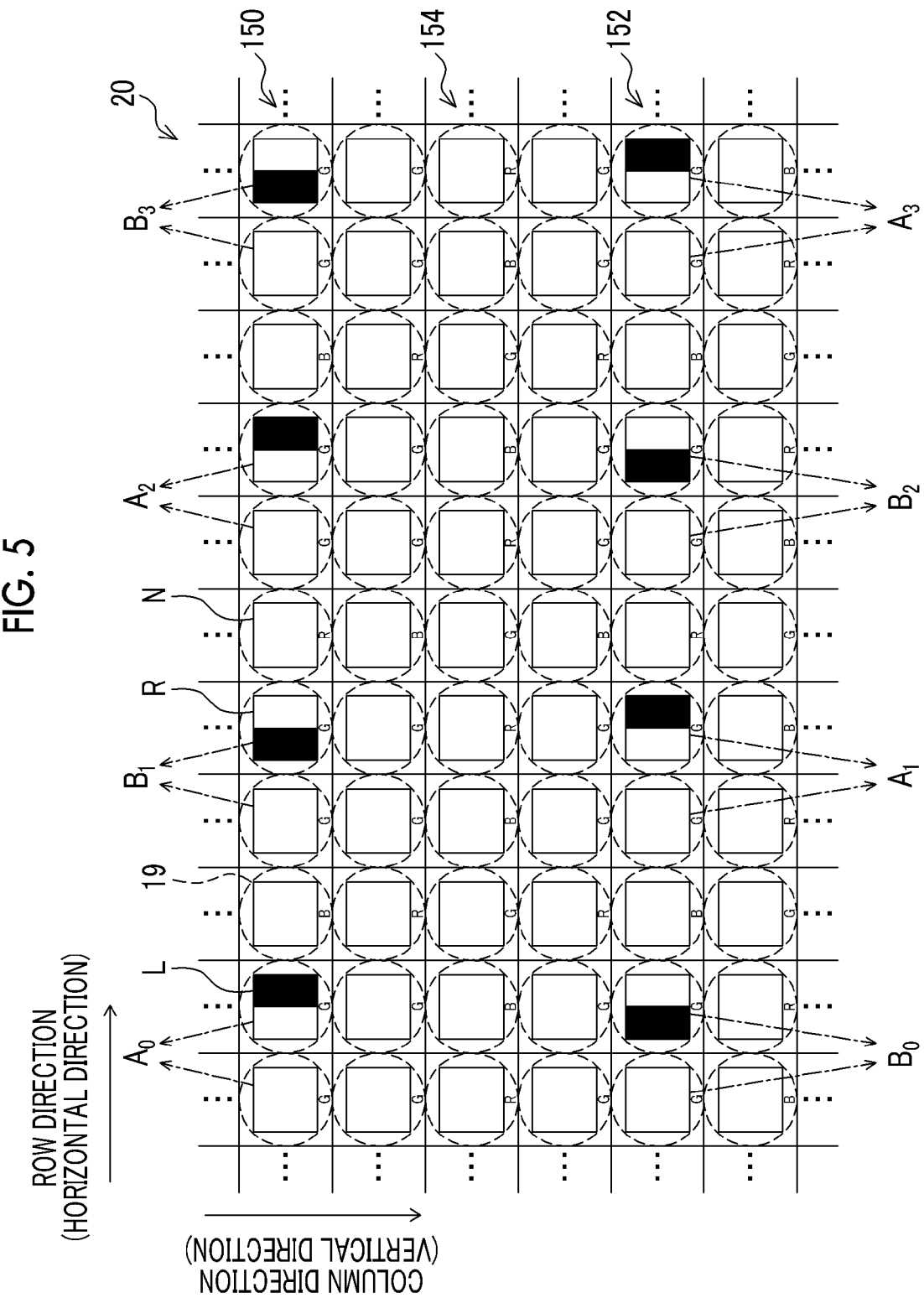
FIG. 5 is a diagram schematically illustrating an example of the arrangement of normal pixels, first pixels, and second pixels and an example of the arrangement of the colors of the color filters allocated to the normal pixels, the first pixels, and the second pixels in the imaging element of the imaging device according to the first to third embodiments.

For example, as illustrated in FIG. 5, the imaging element 20 includes a first pixel L, a second pixel R, and a normal pixel N. A microlens 19 is provided in each of the first pixel L, the second pixel R, and the normal pixel N. Light which passes through the microlens 19 is received by the first pixel L, the second pixel R, and the normal pixel N and is then converted into an electric signal. Any one of the "R", "G", and "B" filters included in the color filter 21 is allocated to each pixel of the imaging element 20. In the example illustrated in FIG. 5, "R" written in the pixel indicates the R filter, "G" written in the pixel indicates the G filter, and "B" written in the pixel indicates the B filter.

The imaging element 20 includes a first pixel row 150, a second pixel row 152, and a third pixel row 154. The first pixel row 150 includes the first pixel L, the second pixel R, and the normal pixel N in the same row. The first pixel L and the second pixel R are alternately arranged in the row direction, with a plurality of normal pixels N (two normal pixels N in FIG. 5) interposed therebetween, such that the first pixel L and the second pixel R are allocated to the G filters. The second pixel row 152 is different from the first pixel row 150 in that the first pixel L and the second pixel R are reversed. The third pixel row 154 indicates a row having only the normal pixels N. The first pixel row 150 and the second pixel row 152 are alternately arranged in the column direction, with a plurality of third pixel rows 154 (for example, the number of third pixel rows 154 is changed in a predetermined cycle in the column direction in the first embodiment) interposed therebetween. In the following description, in case in which the first pixel row 150 and the second pixel row 152 do not need to be distinguished from each other, they are referred to as "phase difference pixel rows".

Figure 6:
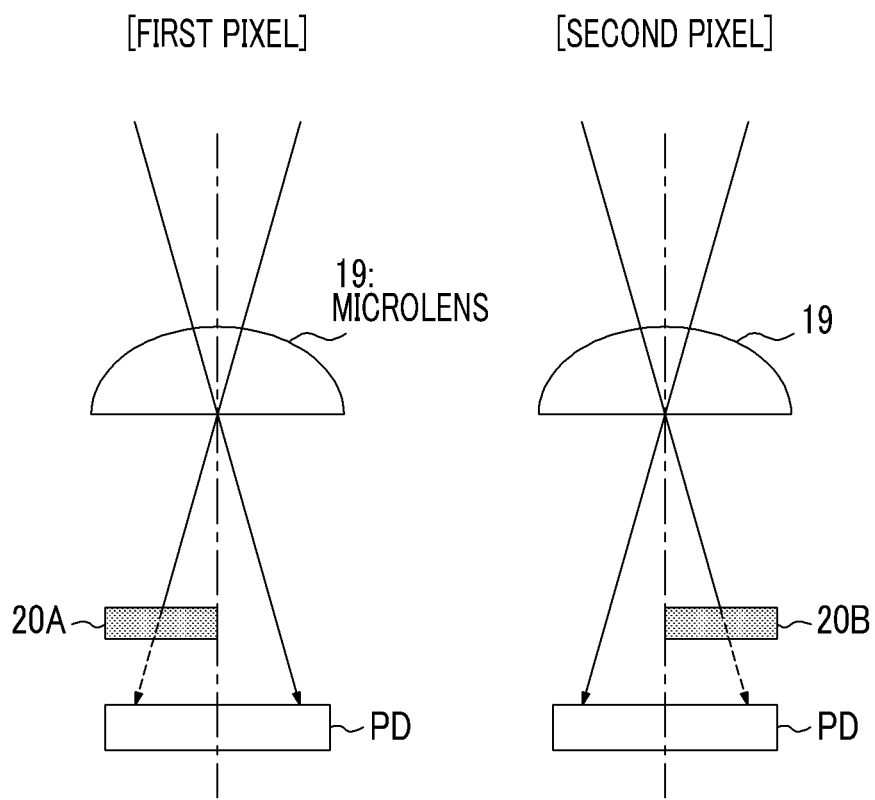
FIG. 6 is a diagram schematically illustrating an example of the structure of the first pixel and the second pixel in the imaging element of the imaging device according to the first to third embodiments.

For example, as illustrated in FIG. 6, the first pixel L is a pixel in which the left half of the light receiving surface in the row direction is shielded by a light shielding member 20A (the left side in case in which the object is viewed from the light receiving surface (in other words, the right side in case in which the light receiving surface is viewed from the object)). For example, as illustrated in FIG. 6, the second pixel R is a pixel in which the right half of the light receiving surface in the row direction is shielded by a light shielding member 20B (the right side in case in which the object is viewed from the light receiving surface (in other words, the left side in case in which the light receiving surface is viewed from the object)). In the following description, in case in which the first pixel L and the second pixel R do not need to be distinguished from each other, they are referred to as "phase difference pixels".

A light flux which passes through the exit pupil of the imaging lens 16 is mainly divided into left region passage light and right region passage light. The left region passage light indicates the left half of the light flux which passes through the exit pupil of the imaging lens 16 and the right region passage light indicates the right half of the light flux which passes through the exit pupil of the imaging lens 16. The light flux which passes through the exit pupil of the imaging lens 16 is divided into left and right light fluxes by the microlens 19 and the light shielding members 20A and 20B serving as a pupil division portion. The first pixel L receives the left region passage light and the second pixel R receives the right region passage light. As a result, an object image corresponding to the left region passage light and an object image corresponding to the right region passage light are acquired as parallax images (a left eye image and a right eye image which will be described below) with parallaxes. In the following description, in case in which the light shielding members 20A and 20B do not need to be distinguished from each other, they are referred to as "light shielding members" without a reference numeral.

The imaging element 20 is divided into a first pixel group (an example of a phase difference pixel group according to the invention), a second pixel group (an example of a phase difference pixel group according to the invention), and a third pixel group. The first pixel group indicates, for example, a plurality of first pixels L which are arranged in a matrix, as illustrated in FIG. 5. The second pixel group indicates, for example, a plurality of second pixels R which are arranged in a matrix, as illustrated in FIG. 5. The third pixel group indicates, for example, a plurality of normal pixels N, as illustrated in FIG. 5. The "normal pixels N" indicate, for example, pixels (for example, pixels without the light shielding members 20A and 20B) other than the phase difference pixels.

Hereinafter, for convenience of explanation, a RAW image which is output from the first pixel group is referred to as a "left eye image". A RAW image which is output from the second pixel group is referred to as a "right eye image". A RAW image which is output from the third pixel group is referred to as a "normal image". Hereinafter, in case in which the left eye image, the right eye image, and the normal image captured at the same time do not need to be distinguished from each other, they are referred to as a "frame". That is, the frame is an example of a captured image according to the invention. In addition, hereinafter, for convenience of explanation, in case in which the left eye image and the right eye image do not need to be distinguished from each other, they are referred to as "phase difference images". The left eye image is an example of a first image according to the invention. The right eye image is an example of the first image according to the invention. The normal image is an example of a second image according to the invention.

Returning to FIG. 3, the imaging element 20 outputs the left eye image (a digital signal indicating a signal output value (hereinafter, referred to as a "pixel value") of each first pixel L) from the first pixel group and outputs the right eye image (a digital signal indicating the pixel value of each second pixel R) from the second pixel group. The imaging element 20 outputs the normal image (a digital signal indicating the pixel value of each normal pixel N) from the third pixel group. That is, the digital signal indicating the pixel value of each first pixel L and the digital signal indicating the pixel value of each second pixel R are an example of a first image signal according to the invention. The digital signal indicating the pixel value of each normal pixel N is an example of a second image signal. The normal image which is output from the third pixel group is a chromatic color image and is, for example, a color image having the same color array as the array of the normal pixels N. The frame which is output from the imaging element 20 is temporarily stored (overwritten and saved) in the frame storage area 25A through the interface unit 24.

The image processing unit 28 performs various kinds of image processing for the frame stored in the frame storage area 25A. The image processing unit 28 is implemented by, for example, an application specific integrated circuit (ASIC) which is an integrated circuit obtained by integrating circuits for implementing a plurality of functions related to image processing. However, the hardware configuration of the image processing unit 28 is not limited thereto. For example, the image processing unit 28 may be a programmable logic device or may have other hardware configurations such as a computer including a CPU, a ROM, and a RAM.

Figure 7:
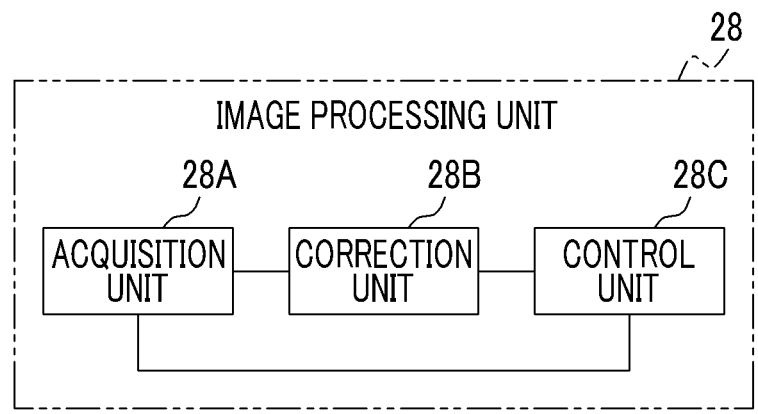
FIG. 7 is a block diagram illustrating an example of the functions of a main portion of the imaging device according to the first to third embodiments.

For example, as illustrated in FIG. 7, the image processing unit 28 includes an acquisition unit 28A, a correction unit 28B, and a control unit 28C. The acquisition unit 28A acquires the left eye image and the right eye image (an example of the first image according to the invention) which are output from the imaging element 20 and the normal image (an example of the second image according to the invention) which is output from the imaging element 20.

The correction unit 28B obtains a first comparison result between the phase difference image and the normal image which are included in a preceding frame (early-acquired image) which is acquired first of a pair of frames which are acquired at different times by the acquisition unit 28A. In addition, the correction unit 28B obtains a second comparison result between the phase difference image and the normal image which are included in a subsequent frame (late-acquired image) which is acquired later of the pair of frames which are acquired at different times by the acquisition unit 28A. The correction unit 28B calculates a shading characteristic correction coefficient on the basis of the first comparison result and the second comparison result and corrects the shading characteristics of the subsequent frame on the basis of the calculated shading characteristic correction coefficient. For example, as illustrated in FIG. 14, the shading characteristic correction coefficient indicates a correction coefficient for correcting shading characteristics which appear in a left eye image for display and a right eye image for display (which will be described below). In the first embodiment, the shading characteristics indicate, for example, linear shading characteristics which appear in the right eye image and the left eye image in each direction along a pupil division direction due to the deviation of the center of the light flux that passes through a pair of regions of the imaging lens 16 from the optical axis of the lens. In addition, the correction unit 28B may calculate the first comparison result, the second comparison result, and the shading characteristic correction coefficient, using an arithmetic expression or a table.

The control unit 28C directs a display device (which will be described below) to continuously display the normal image included in the preceding frame and the normal image included in the subsequent frame, of which the shading characteristics have been corrected, as a moving image. In addition, the control unit 28C directs the display device to continuously display an image (for example, a split image which will be described below) which is based on the phase difference image included in the preceding frame and an image which is based on the phase difference image included in the subsequent frame, of which the shading characteristics have been corrected, as a moving image for checking focus in a normal image display region.

Whenever the imaging element 20 acquires frames corresponding to one screen, the image processing unit 28 performs image processing for the frames in parallel to generate a chromatic normal image and to generate an achromatic split image as the image for checking focus.

Figure 8:
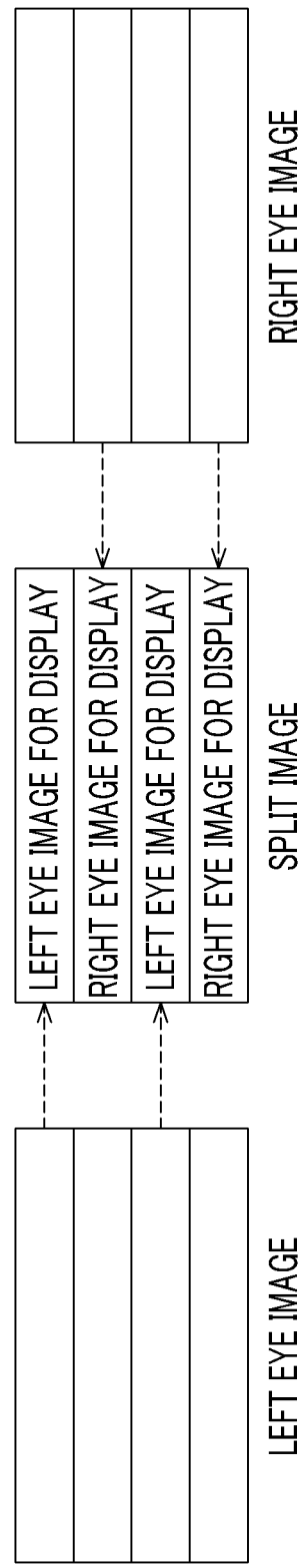
FIG. 8 is a diagram schematically illustrating a method for generating a split image which is generated by an image processing unit included in the imaging device according to the first to third embodiments.

For example, as illustrated in FIG. 8, in the split image, the left eye images for display and the right eye images for display are arranged so as to be adjacent to each other in a predetermined direction (here, for example, a direction perpendicular to a parallax generation direction). The left eye images for display indicate some (the first and third divided images in a front view in the example illustrated in FIG. 8) of four divided images obtained by dividing the left eye image into four images in a predetermined direction. The right eye images for display indicate divided images (the second and fourth divided images in a front view in the example illustrated in FIG. 8) which extracted from four divided images obtained by dividing the right eye image into four images in a predetermined direction and correspond to divided regions adjacent to the divided regions corresponding to the left eye images for display.

Returning to FIG. 3, the hybrid finder 220 includes a liquid crystal display (hereinafter, referred to as a "second display") 247 which displays an electronic image.

The display control unit 36 is connected to the first display 215 and the second display 247. The display control unit 36 selectively controls the first display 215 and the second display 247 such that the first display 215 and the second display 247 selectively display images, in response to an instruction from the CPU 12. Hereinafter, in case in which the first display 215 and the second display 247 do not need to be distinguished from each other, they are referred to as "display devices". The display device is an example of a display unit according to the invention.

Figure 9:
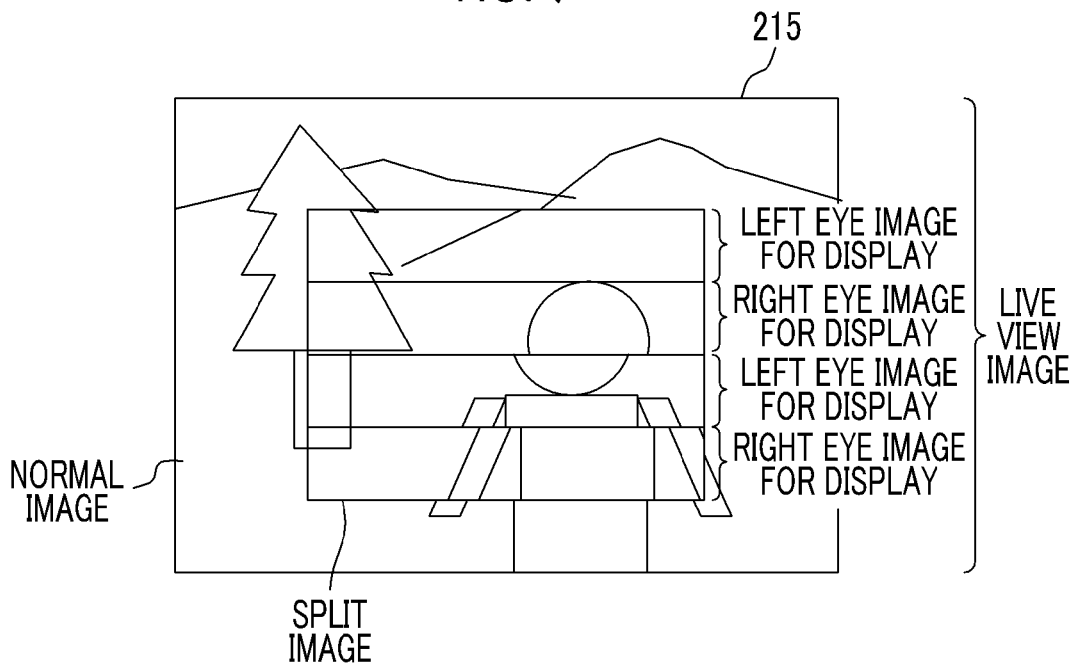
FIG. 9 is a screen view illustrating an example of a live view image including a split image and a normal image which is displayed on a first display included in the imaging device according to the first to third embodiments.

For example, as illustrated in FIG. 9, the split image is displayed in a rectangular frame which is disposed at the center of the screen of the display device and the normal image is displayed in a peripheral region of the split image. FIG. 9 illustrates an example of the split image in which two right eye images for display and two left eye images for display are alternately arranged in a predetermined direction. The left eye image for display and the right eye image for display included in the split image deviate from each other in the direction in which parallax is generated according to a focus state. FIG. 9 illustrates a state in which a peripheral region (for example, a tree) of a person is in focus and the person is out of focus. Hereinafter, for convenience of explanation, in case in which the left eye image for display and the right eye image for display do not need to be distinguished from each other, they are referred to as "parallax images for display".

In the first embodiment, the split image is inserted, instead of a portion of the normal image, and is combined with the normal image. However, the invention is not limited thereto. For example, a combination method which superimposes the split image on the normal image may be used. When the split image is superimposed, a combination method may be used which appropriately adjusts the transmissivities of the split image and a portion of the normal image on which the split image is superimposed. In this case, a live view image indicating object images which are continuously captured is displayed on the screen of the display device. The displayed live view image is an image in which the split image is displayed in the display region of the normal image.

The imaging device 100 according to the first embodiment is configured such that the operation mode can be switched between the manual focus mode and the automatic focus mode by the dial 212 (focus mode switching unit). When any one of the focus modes is selected, the display control unit 36 directs the display device to display the live view image with which the split image is combined. In addition, when the automatic focus mode is selected by the dial 212, the CPU 12 operates as a phase difference detection unit and an automatic focus adjustment unit. The phase difference detection unit detects a phase difference between the left eye image output from the first pixel group and the right eye image output from the second pixel group. The automatic focus adjustment unit controls the motor 304 through the mounts 256 and 346 on the basis of the detected phase difference such that the amount of defocus of the focus lens 302 is zero, in response to an instruction from the device control unit 22 and moves the focus lens 302 to the focus position. The "amount of defocus" means, for example, the amount of phase shift between the left eye image and the right eye image.

Returning to FIG. 3, the eye approach detection unit 37 detects whether the user (for example, a photographer) looks through the finder eyepiece 242 and outputs the detection result to the CPU 12. Therefore, the CPU 12 can check whether the finder eyepiece 242 is used on the basis of the detection result of the eye approach detection unit 37.

The external I/F 39 is connected to a communication network, such as a local area network (LAN) or the Internet, and transmits and receives various kinds of information between an external apparatus (for example, a printer) and the CPU 12 through the communication network. Therefore, in case in which a printer is connected as the external apparatus, the imaging device 100 can output the captured still image to the printer such that the still image is printed by the printer. In case in which a display is connected as the external apparatus, the imaging device 100 can output the captured still image or live view image to the display such that the display displays the image.

Figure 10:
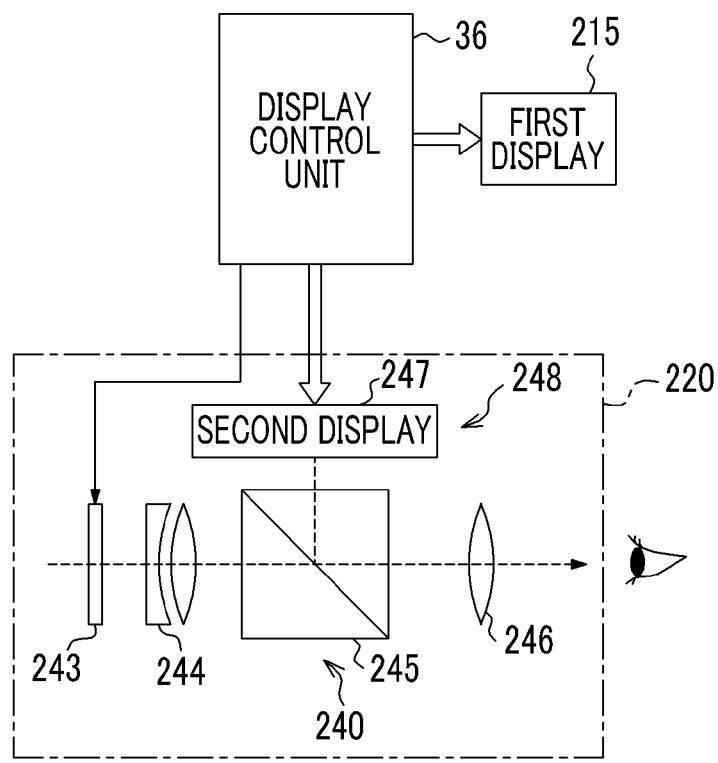
FIG. 10 is a diagram schematically illustrating an example of the structure of a hybrid finder included in the imaging device according to the first to third embodiments.

For example, as illustrated in FIG. 10, the hybrid finder 220 includes the OVF 240 and the EVF 248. The OVF 240 is an inverted Galilean finder including an objective lens 244 and an eyepiece lens 246. The EVF 248 includes the second display 247, a prism 245, and the eyepiece lens 246.

A liquid crystal shutter 243 is provided in front of the objective lens 244. The liquid crystal shutter 243 shields light such that no optical image is incident on the objective lens 244 when the EVF 248 is used.

The prism 245 reflects an electronic image or various kinds of information displayed on the second display 247 to the eyepiece lens 246 and combines the optical image and information (the electronic image or various kinds of information) displayed on the second display 247.

Whenever the finder switching lever 214 is rotated in the direction of the arrow SW illustrated in FIG. 1, the operation mode is alternately switched between an OVF mode in which an optical image can be viewed through the OVF 240 and an EVF mode in which an electronic image can be viewed through the EVF 248.

In the OVF mode, the display control unit 36 performs control such that the liquid crystal shutter 243 does not shield light and an optical image can be viewed through the finder eyepiece 242. In addition, the display control unit 36 directs the second display 247 to display only the split image. Therefore, it is possible to display a finder image in which the split image is superimposed on a portion of the optical image.

In contrast, in the EVF mode, the display control unit 36 performs control such that the liquid crystal shutter 243 shields light and only the electronic image displayed on the second display 247 can be viewed through the finder eyepiece 242. In addition, the same image data as that, with which the split image output to the first display 215 is combined, is input to the second display 247. Therefore, the second display 247 can display an electronic image in which the split image is combined with a portion of the normal image, similarly to the first display 215.

Figure 11:
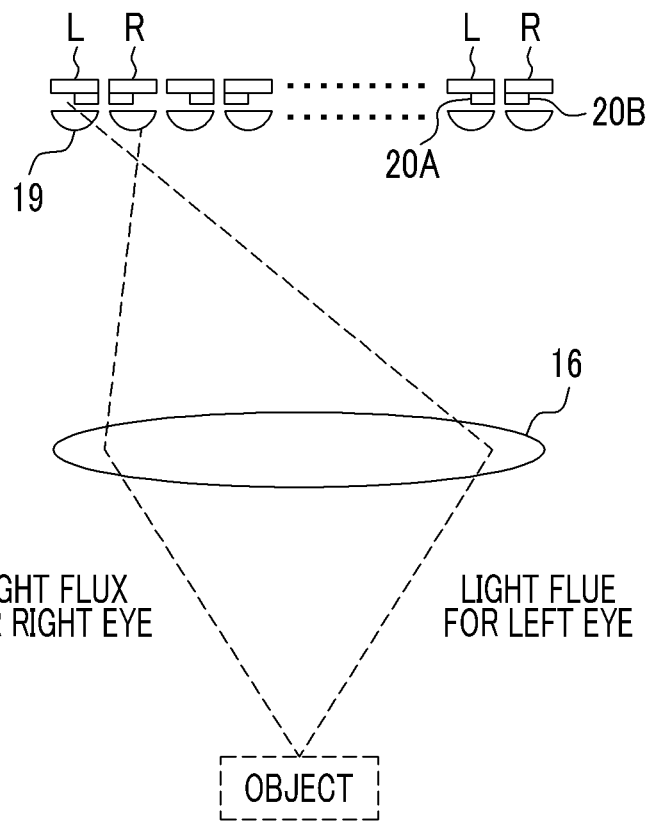
FIG. 11 is a diagram illustrating the principle of shading characteristics by left region passage light and right region passage light (an example of the path of a light flux incident on each of the first and second pixels).
Figure 12:
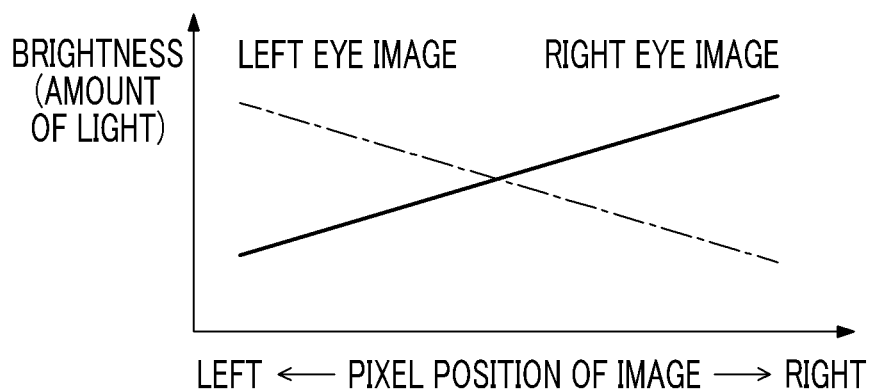
FIG. 12 is a graph illustrating an example of the influence of linear shading characteristics in a pupil division direction on the output of each pixel in a direction corresponding to the pupil division direction in each of a left eye image and a right eye image.

In the imaging device 100, for example, as illustrated in FIG. 11, in case in which an image of the object is captured, left region passage light which has passed through the imaging lens 16 is incident on the first pixel L through the microlens 19 corresponding to the first pixel L. However, when the left region passage light passes through the microlens 19 corresponding to the second pixel R, it is blocked by the light shielding member 20B and is not incident on the second pixel R. In contrast, right region passage light which has passed through the imaging lens 16 is incident on the second pixel R through the microlens 19 corresponding to the second pixel R. However, in case in which the right region passage light passes through the microlens 19 corresponding to the first pixel L, it is blocked by the light shielding member 20A and is not incident on the first pixel L. As such, the light shielding member is provided in the half of the pixel and the center of each of the left region passage light and the right region passage light deviates from the optical axis of the imaging lens 16. Therefore, in each of the first pixel group and the second pixel group, the shading characteristics vary linearly depending on the position of the pixel in the pupil division direction. A change in the shading characteristics appears as a change in the output of the left eye image and the right eye image. That is, the output of the left eye image and the right eye image which are obtained in case in which a uniform amount of light is incident on the imaging lens 16 from the front side, in the left-right direction (a direction corresponding to the pupil division direction) varies linearly depending on the position of the pixel. For example, as illustrated in FIG. 12, the output of the left eye image is reduced as the position of the pixel becomes closer to the right side and the output of the right eye image is reduced as the position of the pixel becomes closer to the left side. The linear changes in the outputs of the left eye image and the right eye image, which are opposite to each other in the left-right direction, have an effect on the quality of the split image.

Figure 13:
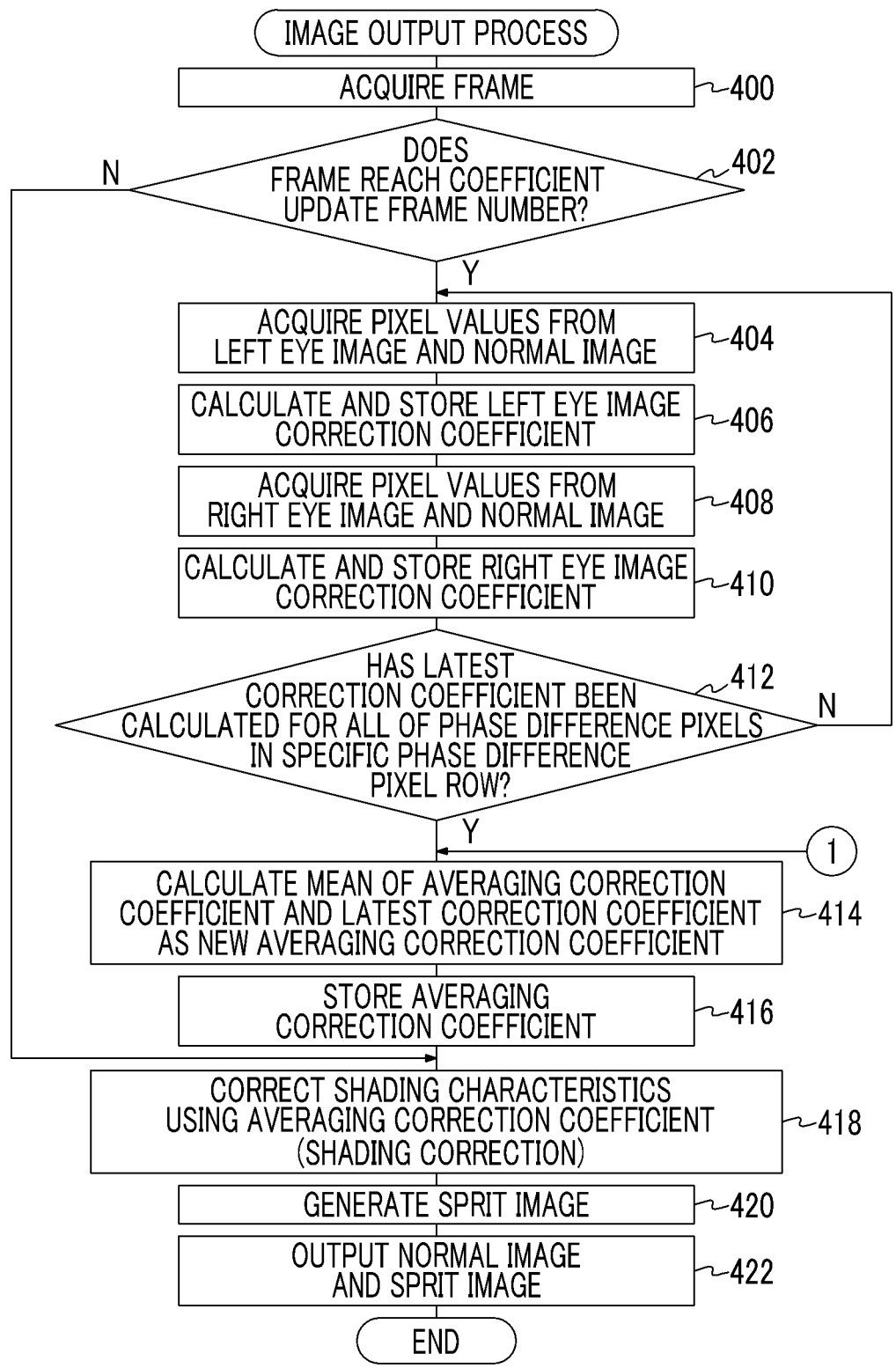
FIG. 13 is a flowchart illustrating an example of the flow of an image output process according to the first embodiment.

In the imaging device 100 according to the first embodiment, the image processing unit 28 performs, for example, an image output process illustrated in FIG. 13. Hereinafter, as the operation of the imaging device 100 according to the first embodiment, the image output process performed by the image processing unit 28 will be described with reference to FIG. 13. The image processing unit 28 performs the image output process illustrated in FIG. 13 in case in which a set of the left eye image, the right eye image, and the normal image is stored in the frame storage area 25A after the manual focus mode is set.

In the image output process illustrated in FIG. 13, first, in Step 400, the acquisition unit 28A acquires a frame from the frame storage area 25A. Then, the process proceeds to Step 402.

In Step 402, the correction unit 28B determines whether the frame reaches a coefficient update frame number (for example, one frame) at the time when the manual focus mode is set or at the previous time when the frame is acquired in Step 400. In case in which it is determined in Step 402 that the frame reaches the coefficient update frame number at the time when the manual focus mode is set or at the previous time when the frame is acquired in Step 400, that is, the determination result is "Yes", the process proceeds to Step 404. In case in which it is determined in Step 402 that the frame does not reach the coefficient update frame number at the time when the manual focus mode is set or at the previous time when the frame is acquired in Step 400, that is, the determination result is "No", the process proceeds to Step 418.

In Step 404, the correction unit 28B acquires the pixel value of a specific pixel position in a specific phase difference pixel row from each of the left eye image and the normal image acquired in Step 400. Then, the process proceeds to Step 406. The specific phase difference pixel row is, for example, the first pixel row 150 at the top of the imaging element 150 in the column direction. In addition, the specific pixel position is a pixel position of which the pixel value has not been acquired in Step 404 and Step 408 in the specific first pixel row 150.

In Step 406, the correction unit 28B calculates a left eye image correction coefficient (an example of a value based on the second comparison result and a second comparison value according to the invention). Then, the correction unit 28B stores (overwrites and saves) the calculated left eye image correction coefficient in the first correction coefficient storage area 25B so as to be associated with the coordinates of the pixel position (for example, coordinates capable of specifying the pixel position of which the pixel value has been acquired in Step 404). Then, the process proceeds to Step 408. The left eye image correction coefficient indicates, for example, the proportion An (in the example illustrated in FIG. 5, a proportion $A_0$, a proportion $A_1$, a proportion $A_2$, or a proportion $A_3$) of the value of an adjacent left eye pixel to the pixel value of the normal image N at a specific pixel position. For example, as illustrated in FIG. 5, the adjacent left eye pixel indicates the first pixel L which is adjacent to the normal pixel N at a specific pixel position.

In Step 408, the correction unit 28B acquires the pixel value of a specific pixel position in a specific phase difference pixel row from each of the right eye image and the normal image acquired in Step 400. Then, the process proceeds to Step 410.

In Step 410, the correction unit 28B calculates a right eye image correction coefficient (an example of a value based on the second comparison result and the second comparison value according to the invention). Then, the correction unit 28B stores (overwrites and saves) the calculated right eye image correction coefficient in the second correction coefficient storage area 25C so as to be associated with the coordinates of the pixel position (for example, coordinates capable of specifying the pixel position of which the pixel value has been acquired in Step 404). Then, the process proceeds to Step 412. The right eye image correction coefficient indicates, for example, the proportion Bn (in the example illustrated in FIG. 5, a proportion $B_0$, a proportion $B_1$, a proportion $B_2$, or a proportion $B_3$) of the value of an adjacent right eye pixel to the pixel value of the normal image N at a specific pixel position. For example, as illustrated in FIG. 5, the adjacent right eye pixel indicates the second pixel R which is adjacent to the normal pixel N at a specific pixel position.

In the following description, for convenience of explanation, in case in which the left eye image correction coefficient and the right eye image correction coefficient do not need to be distinguished from each other, there are referred to as the "latest correction coefficients". In the first embodiment, the value obtained by dividing the value of the normal pixel N by the value of the phase difference pixel is used as the latest correction coefficient. However, a value obtained by multiplying the division result by an adjustment coefficient may be used as the latest correction coefficient. In addition, a value based on the difference between the value of the normal pixel N and the value of the phase difference pixel may be used as the latest correction coefficient. As such, a comparison value between the value of the normal pixel N and the value of the phase difference pixel may be used as the latest correction coefficient.

In the first embodiment, the value of the normal pixel N is compared with the value of the second pixel R to calculate the right eye image correction coefficient. However, the right eye image correction coefficient may be estimated with reference to the left eye image correction coefficient. In this case, for example, a value obtained by multiplying the left eye image correction coefficient of the first pixel L at a position corresponding to the position of the second pixel R by an adjustment coefficient which is individually determined for each pixel position may be used as the right eye image correction coefficient.

In Step 412, the correction unit 28B determines whether the latest correction coefficient has been calculated for all of the phase difference pixels in a specific phase difference pixel row in Step 406 and Step 410. In case in which it is determined in Step 412 that the latest correction coefficient has been calculated for all of the phase difference pixels in the specific phase difference pixel row in Step 406 and Step 410, that is, the determination result is "Yes", the process proceeds to Step 414. In case in which it is determined in Step 412 that the latest correction coefficient has not been calculated for all of the phase difference pixels in the specific phase difference pixel row in Step 406 and Step 410, that is, the determination result is "No", the process proceeds to Step 404.

In Step 414, the correction unit 28B calculates the mean of the first averaging correction coefficient stored in the first use factor storage area 26A and the left eye image correction coefficient stored in the first correction coefficient storage area 25B as a new first averaging correction coefficient. In addition, the correction unit 28B calculates the mean of the second averaging correction coefficient stored in the second use factor storage area 26B and the right eye image correction coefficient stored in the second correction coefficient storage area 25C as a new second averaging correction coefficient.

Figure 18:
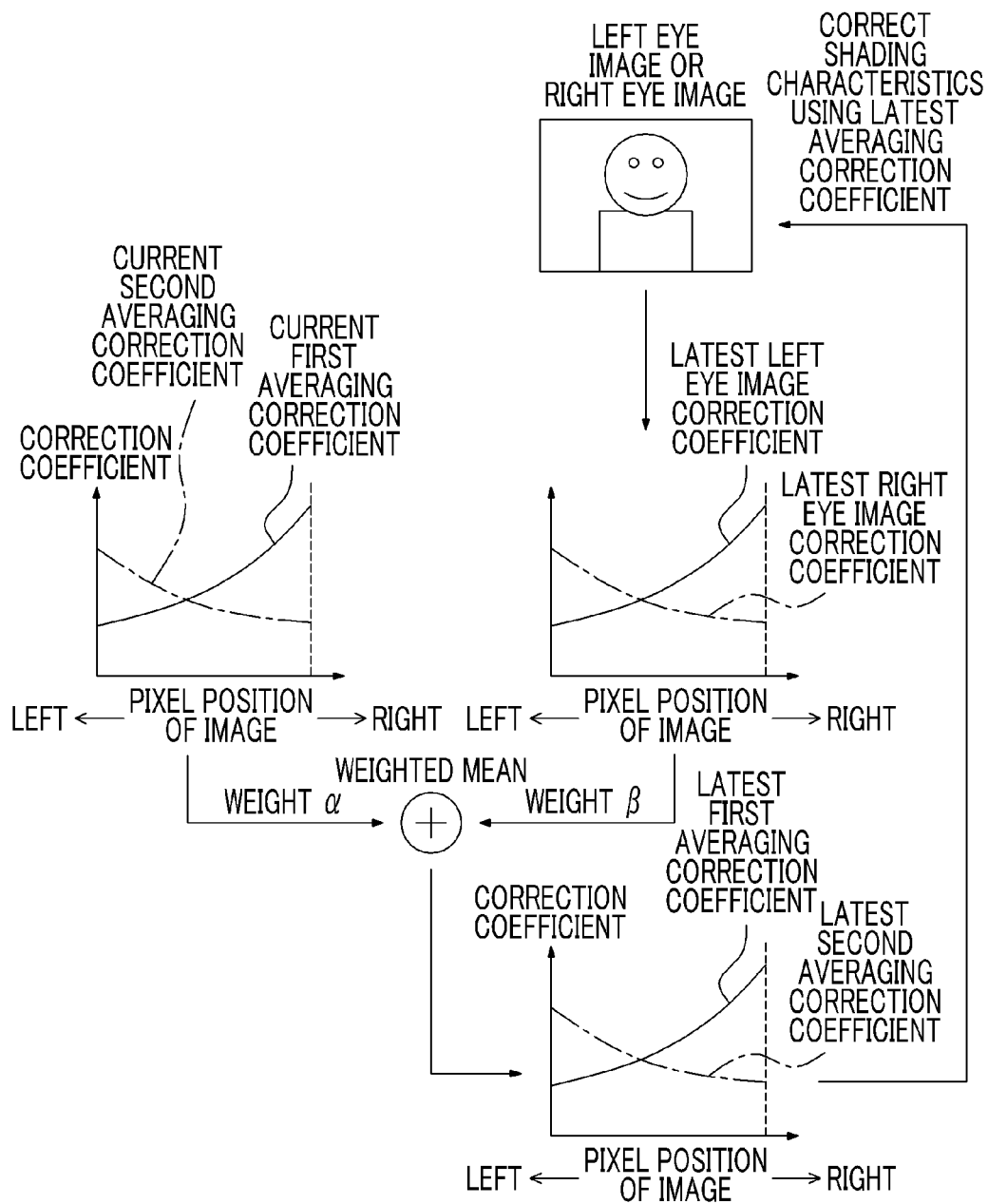
FIG. 18 is a diagram schematically illustrating a calculation method of first and second averaging correction coefficients by a correction unit of the image processing unit included in the imaging device according to the first to third embodiments.

Here, as illustrated in FIG. 18, the mean of the first averaging correction coefficient and the left eye image correction coefficient indicates, for example, the weighted mean of the first averaging correction coefficient and the left eye image correction coefficient for each pixel (for example, each coordinate value stored in the first correction coefficient storage area 25B). The weighted mean of the first averaging correction coefficient and the left eye image correction coefficient indicates the mean (for example, a curve graph represented by a solid line in FIG. 18) of a value obtained by multiplying the first averaging correction coefficient by a weight α (first weight) and a value obtained by multiplying the left eye image correction coefficient by a weight β (second weight).

The mean of the second averaging correction coefficient and the right eye image correction coefficient indicates the weighted mean of the second averaging correction coefficient and the right eye image correction coefficient for each pixel (for example, each coordinate value stored in the second correction coefficient storage area 25C). The weighted mean of the second averaging correction coefficient and the right eye image correction coefficient indicates the mean (for example, a curve graph represented by a one-dot chain line in FIG. 18) of a value obtained by multiplying the second averaging correction coefficient by a weight α and a value obtained by multiplying the right eye image correction coefficient by a weight β.

The weight α and the weight β may be fixed values or variable values (for example, values customized according to the instruction received by the touch panel 216). In addition, the weight β may increase to a predetermined upper limit and the weight α may decrease to a predetermined lower limit, according to a reduction in the processing speed of the CPU 12 (an increase in the load of calculation). Examples of the ratio pattern between the weight α and the weight β may include a first ratio pattern having a magnitude relationship of "α>β" (for example, α=0.9 and β=0.1) and a second ratio pattern having a magnitude relationship of "α≤β" (for example, α=0.5 and β=0.5). When the first ratio pattern is used, it is possible to improve the correction accuracy of the shading characteristics (to improve image quality). When the second ratio pattern is used, it is possible to reduce the time required to correct the shading characteristics (to increase the processing speed).

In Step 414, the first averaging correction coefficient stored in the first use factor storage area 26A is an example of a value based on the shading characteristic correction coefficient, the first comparison result, and the first comparison value according to the invention. In Step 414, the second averaging correction coefficient stored in the second use factor storage area 26B is an example of a value based on the shading characteristic correction coefficient, the first comparison result, and the first comparison value according to the invention.

Then, in Step 416, the correction unit 28B stores the first averaging correction coefficient calculated in Step 414 in the first use factor storage area 26A for each pixel (for example, each coordinate value stored in the first correction coefficient storage area 25B). In addition, the correction unit 28B stores the second averaging correction coefficient calculated in Step 414 for in the second use factor storage area 26B each pixel (for example, each coordinate value stored in the second correction coefficient storage area 25C).

Then, in Step 418, the correction unit 28B corrects the shading characteristics of the left eye image acquired in Step 400, using the first averaging correction coefficient stored in the first use factor storage area 26A (performs so-called shading correction). In addition, the correction unit 28B corrects the shading characteristics of the right eye image acquired in Step 400, using the second averaging correction coefficient stored in the second use factor storage area 26B.

Then, in Step 420, the control unit 28C generates a split image on the basis of the left eye image and the right eye image of which the shading characteristics have been corrected in Step 418 and the process proceeds to Step 422.

In Step 422, the control unit 28C outputs the normal image acquired in Step 400 and the split image generated in Step 420 to the display control unit 36. Then, the image output process ends. When the normal image and the split image are input, the display control unit 36 performs control such that the display device continuously displays the normal image as a moving image and the split image is continuously displayed as a moving image in the display region of the normal image. Then, for example, as illustrated in FIG. 9, the display device displays a live view image.

As such, the photographer can check the focus state, using the split image displayed on the display device. In addition, in the manual focus mode, the photograph can operate the focus ring 301 to adjust the amount of defocus to zero.

In case in which the correction unit 28B corrects the shading characteristics of the split image, for example, a linear change in the brightness of the parallax image for display due to a linear change in the sensitivity of each pixel in the first and second pixel groups in the pupil division direction is reduced, as illustrated in FIG. 14.

As described above, in the imaging device 100, the latest correction coefficient which is the result of the comparison between the phase difference image and the normal image included in the subsequent frame that is acquired later of a pair of frames acquired at different times is calculated. When the latest correction coefficient is calculated, new first and second averaging correction coefficients are calculated on the basis of the first and second averaging correction coefficients, which are the results of the comparison between the phase difference image and the normal image included in the preceding frame that is acquired first of the pair of frames, and the calculated latest correction coefficient. Then, a live view image including the split image, of which the shading characteristics have been corrected using the new first and second averaging correction coefficients, is displayed on the display device. Therefore, the imaging device 100 can instantaneously correct the shading characteristics, as compared to a case without the structure in which the shading characteristics are corrected using the new first and second averaging correction coefficients which are calculated on the basis of the current first and second averaging correction coefficients and the latest correction coefficient.

In the imaging device 100, the values obtained by averaging the latest correction coefficient and the first and second averaging correction coefficients (the current first and second averaging correction coefficients) used to correct the shading characteristics of the preceding frame of a pair of frames are used as new first and second averaging correction coefficients. Therefore, the imaging device 100 can obtain the first and second averaging correction coefficients corresponding to the current imaging conditions, as compare to the case in which the values obtained by averaging the current first and second averaging correction coefficients and the latest correction coefficient are not used as the new first and second averaging correction coefficients.

In the imaging device 100, each of the first and second averaging correction coefficients is a comparison value between the pixel values of the phase difference image and the normal image at corresponding pixel positions (for example, the same pixel position in the row direction). The latest correction coefficient is a comparison value between the pixel values of the phase difference image and the normal image at corresponding pixel positions. Therefore, the imaging device 100 can obtain the first and second averaging correction coefficients that enable the brightness of each pixel of the phase difference image, of which the shading characteristics have been corrected, to correspond to the brightness of each pixel of the normal image, as compared to a case without having the above-mentioned structure.

In the imaging device 100, the mean of the left eye image correction coefficients, which are the results of the comparison between the left eye image and the normal image included in the subsequent frame of a pair of frames, is calculated (Step 406). In addition, the mean of the right eye image correction coefficients, which are the results of the comparison between the right eye image and the normal image included in the subsequent frame of the pair of frames, is calculated (Step 410). Here, a new first averaging correction coefficient for correcting the shading characteristics of the left eye image is calculated on the basis of the mean of the current first averaging correction coefficient, which is the result of the comparison between the left eye image and the normal image included in the preceding frame, and the calculated left eye image correction coefficient (Step 414). In addition, a new second averaging correction coefficient for correcting the shading characteristics of the right eye image is calculated on the basis of the mean of the current second averaging correction coefficient, which is the result of the comparison between the right eye image and the normal image included in the preceding frame, and the calculated right eye image correction coefficient (Step 414). Then, the shading characteristics of the left eye image included in the subsequent frame is corrected on the basis of the calculated new first averaging correction coefficient, and the shading characteristics of the right eye image included in the subsequent frame is corrected on the basis of the calculated new second averaging correction coefficient (Step 418). Therefore, the imaging device 100 can correct the shading characteristics of the right eye image and the left eye image with high accuracy, as compared to a case without having the above-mentioned structure.

In the first embodiment, the left eye image correction coefficient and the right eye image correction coefficient are calculated from each of the acquired left eye image and normal image on the basis of the pixel value of a specific pixel position in a specific phase difference pixel row. However, the invention is not limited thereto. For example, the left eye image correction coefficient and the right eye image correction coefficient may be calculated on the basis of the mean of the pixel values of the first pixels L and the mean of the pixel values of the second pixels R at the same pixel position in the row direction of the imaging element 20.

In the first embodiment, each of the first and second averaging correction coefficients which are obtained on the basis of the pixel values of the phase difference pixels in a specific phase difference pixel row is used to correct the shading characteristics of the phase difference pixels in another row. However, the invention is not limited thereto. For example, each of the first and second averaging correction coefficients may be calculated for all of the phase difference pixel rows and the means, modes, or medians of the first and second averaging correction coefficients which are obtained from the same pixel position in the row direction may be calculated as new first and second averaging correction coefficients used for correction.

In the first embodiment, the pixel values obtained from the normal pixel N and the phase difference pixel which are adjacent in the row direction are compared with each other. However, the invention is not limited thereto. For example, in case in which no normal pixel N is adjacent to the phase difference pixel, the pixel value of the phase difference pixel may be compared with the pixel value of the normal pixel N that is closest to the phase difference pixel.

In the first embodiment, the first pixel row 150 which is arranged at the top of the imaging element 20 in the column direction is given as an example of the specific phase difference pixel row from which the pixel value is acquired in Steps 404 and 408. However, the invention is not limited thereto. For example, the first pixel row 150 or the second pixel row 152 which is arranged at the center of the imaging element 150 in the column direction may be used as the specific phase difference pixel row, or the first pixel row 150 or the second pixel row 152 which is arranged at the bottom of the imaging element 150 in the column direction may be used as the specific phase difference pixel row. The specific phase difference pixel row from which the pixel values are acquired in Steps 404 and 408 may be selectively set according to the imaging conditions such as the type of imaging lens 16 or an aperture value. In addition, the specific pixel position of which the pixel value is acquired in Steps 404 and 408 may be selectively set according to the imaging conditions such as the type of imaging lens 16 or the aperture value.

In the first embodiment, the new first and second averaging correction coefficients are calculated for each frame. However, the invention is not limited thereto. For example, the new first and second averaging correction coefficients may be calculated for each number of frames which are determined according to the current processing speed (calculation load) of the CPU 12. For example, in case in which the processing speed of the CPU 12 is less than a threshold value, the new first and second averaging correction coefficients are calculated for every five frames. In case in which the processing speed of the CPU 12 is equal to or greater than the threshold value, the new first and second averaging correction coefficients are calculated for each frame.

The flow of the image output process (see FIG. 13) described in the first embodiment is illustrative. Therefore, unnecessary steps may be removed, new steps may be added, or the order of the steps in the process may be changed, without departing from the scope and spirit of the invention. In addition, each step in the image output process described in the first embodiment may be implemented by software configuration, that is, the execution of a program by a computer, or a combination of hardware configuration and software configuration. Furthermore, each step in the image output process described in the first embodiment may be implemented by hardware configuration, such as an ASIC or a programmable logic device, or a combination of hardware configuration and software configuration.

In case in which the computer executes the program to implement the image output process described in the first embodiment, the program may be stored in a predetermined storage area (for example, the secondary storage unit 26) in advance. However, the program is not necessarily stored in the secondary storage unit 26 at the beginning. For example, the program may be stored in an arbitrary portable storage medium, such as a solid state drive (SSD), a CD-ROM, a DVD disk, a magneto-optical disk, or an IC card which is connected to the computer and is then used, in advance. Then, the computer may acquire the program from the portable storage medium and execute the program. In addition, the program may be stored in another computer or a server apparatus connected to the computer through, for example, the Internet or a local area network (LAN) and the computer may acquire the program and execute the program.

When each step in the image output process described in the first embodiment is implemented by software configuration, for example, the CPU 12 may execute an image output processing program such that the image output process is performed in the imaging device 100. The image output processing program indicates, for example, a program including an acquisition process, a correction process, and a control process. The image output processing program may be stored in the secondary storage unit 26. The CPU 12 may read the image output processing program from the secondary storage unit 26, develop the image output processing program in the primary storage unit 25, and sequentially perform the acquisition process, the correction process, and the control process. In this case, the CPU 12 performs the acquisition process to implement the same operation as that of the acquisition unit 28A illustrated in FIG. 7. The CPU 12 performs the correction process to implement the same operation as that of the correction unit 28B illustrated in FIG. 7. The CPU 12 performs the control process to implement the same operation as that of the control unit 28C illustrated in FIG. 7.

The imaging device 100 described in the first embodiment may have a function of checking the depth of field (field depth check function). In this case, for example, the imaging device 100 has a field depth check key. The field depth check key may be a hardware key or a software key. In case in which the hardware key is pressed to issue an instruction, it is preferable to apply a momentary switch (non-hold switch). For example, during the period for which the momentary switch is pressed at a predetermined position, a specific operation state of the imaging device 100 is maintained. Here, when the field depth check key is pressed, the aperture value is changed. When the field depth check key is maintained in a pressed state (the field depth check is maintained at a predetermined position), the aperture value changes continuously until it reaches a limit value. As such, when the field depth check key is maintained in a pressed state, the aperture value changes. Therefore, in some cases, the phase difference required to obtain the split image is not obtained. In case in which the field depth check key is pressed with the split image being displayed, display may be changed from the split image to general live view display while the field depth check key is being pressed. In addition, when the pressed state is removed, the CPU 12 may switch a screen such that the split image is displayed again. Here, the momentary switch is given as an example of the field depth check key. However, the invention is not limited thereto. For example, an alternate switch (hold switch) may be applied.

Second Embodiment

In the first embodiment, the latest correction coefficient is individually calculated for each phase difference pixel. However, in a second embodiment, a case in which the latest correction coefficient is calculated for each set of a plurality of phase difference pixels. In the second embodiment, the same components as those in the first embodiment are denoted by the same reference numerals and the description thereof will not be repeated.

Figure 15:
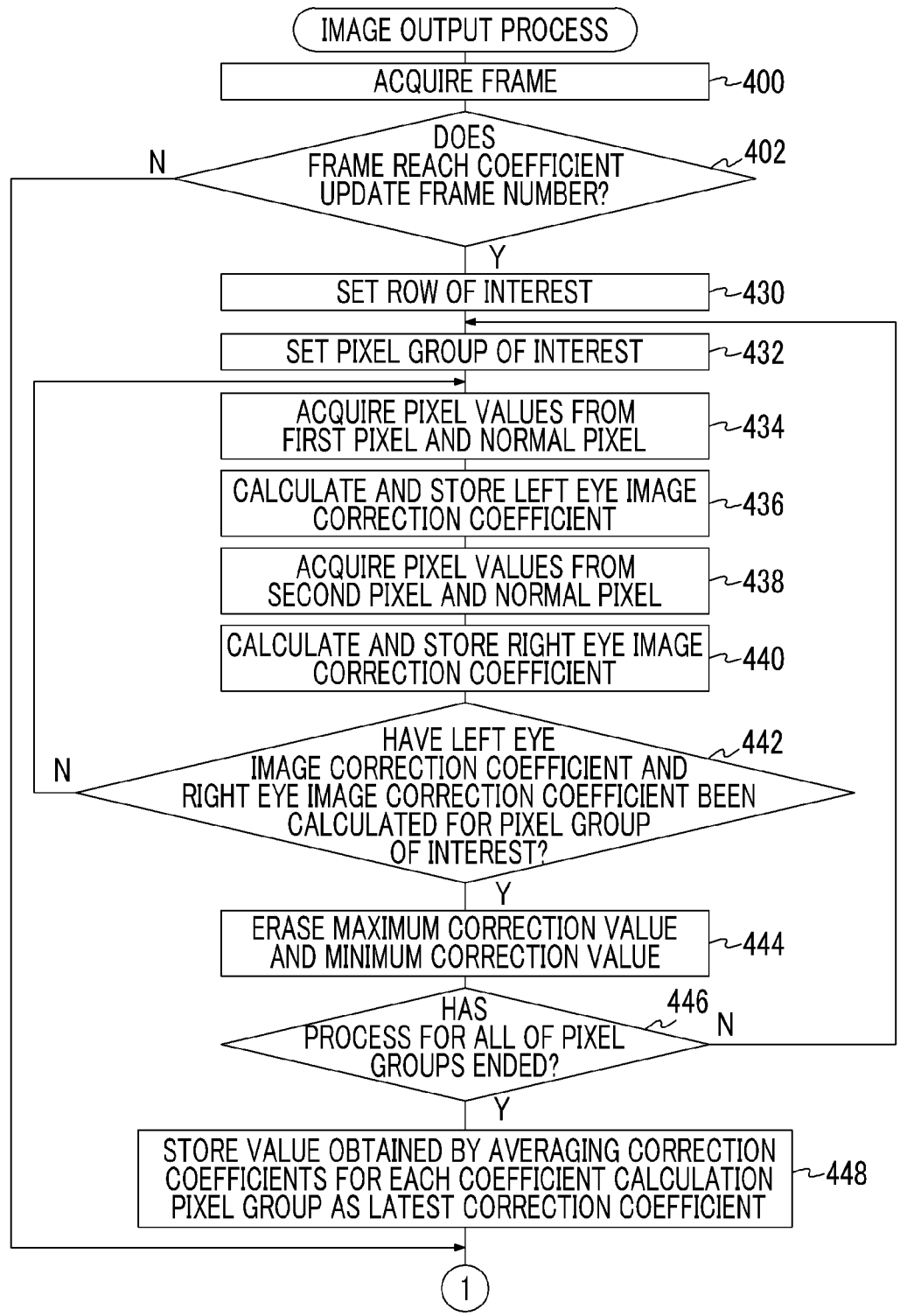
FIG. 15 is a flowchart illustrating an example of the flow of an image output process according to the second embodiment.

An imaging device 100A according to the second embodiment differs from the imaging device 100 according to the first embodiment in that the image processing unit 28 performs an image output process illustrated in FIG. 15, instead of the image output process illustrated in FIG. 13. The image output process illustrated in FIG. 15 differs from the image output process illustrated in FIG. 13 in that it includes Steps 430 to 448, instead of Steps 404 to 412.

Figure 16:
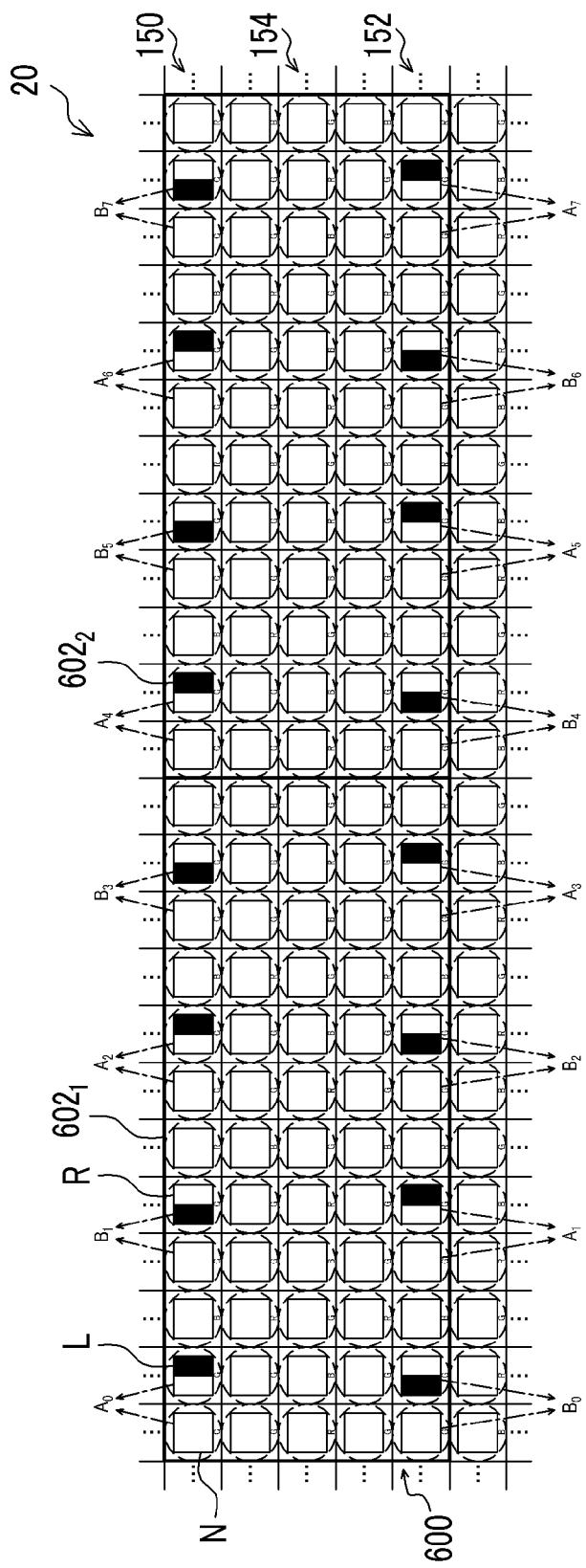
FIG. 16 is a diagram schematically illustrating an example of a row of interest and a pixel group of interest which are set by the image output process according to the second embodiment.

In the image output process illustrated in FIG. 15, in Step 430, the correction unit 28B sets rows 600 of interest (see FIG. 16) in the frame acquired in Step 400. Then, the process proceeds to Step 432. For example, as illustrated in FIG. 16, the rows 600 of interest indicate five rows including two phase difference pixel rows (rows having a plurality of phase difference pixels arranged in the pupil division direction).

In Step 432, the correction unit 28B sets a coefficient calculation pixel group $602_n$ (see FIG. 16) as a pixel group of interest in the rows 600 of interest set in Step 430. The process proceeds to Step 434. In the example illustrated in FIG. 16, coefficient calculation pixel groups $602_1$ and $602_2$ are given as an example of the coefficient calculation pixel group $602_n$. For example, as illustrated in FIG. 16, the coefficient calculation pixel group $602_n$ is a pixel group having a matrix shape (a 5×12 matrix in the example illustrated in FIG. 16). The coefficient calculation pixel group $602_n$ includes a plurality of normal pixels N, a plurality of first pixels L (four first pixels L in the example illustrated in FIG. 16), and a plurality of second pixels R (four second pixel R in the example illustrated in FIG. 16). The pixel group of interest in Step 432 indicates a pixel group which has not been processed in Steps 434 to 440.

In Step 434, the correction unit 28B acquires the value of a specific first pixel L and the value of a specific normal pixel N in the coefficient calculation pixel group $602_n$ set in Step 432. Then, the process proceeds to Step 436. In Step 434, the specific first pixel L indicates a first pixel L of which the value has not been acquired in Step 434 among the plurality of first pixels L included in the coefficient calculation pixel group $602_n$. In Step 434, the specific normal pixel N indicates a normal pixel N which is adjacent to the specific first pixel L.

In Step 436, the correction unit 28B calculates a left eye image correction coefficient. Then, the correction unit 28B stores (overwrites and saves) the calculated left eye image correction coefficient in the first correction coefficient storage area 25B so as to be associated with the coordinates of a pixel position (for example, coordinates capable of specifying the position of the first pixel L of which the value has been acquired in Step 434). Then, the process proceeds to Step 438.

In Step 438, the correction unit 28B acquires the value of a specific second pixel R and the value of a specific normal pixel N in the coefficient calculation pixel group $602_n$ set in Step 432. Then, the process proceeds to Step 440. In Step 438, the specific second pixel R indicates a second pixel R of which the value has not been acquired in Step 438 among the plurality of second pixels R included in the coefficient calculation pixel group $602_n$. In Step 438, the specific normal pixel N indicates a normal pixel N which is adjacent to the specific second pixel R.

In Step 440, the correction unit 28B calculates a right eye image correction coefficient. Then, the correction unit 28B stores (overwrites and saves) the calculated right eye image correction coefficient in the second correction coefficient storage area 25C so as to be associated with the coordinates of a pixel position (for example, coordinates capable of specifying the position of the second pixel R of which the value has been acquired in Step 438). Then, the process proceeds to Step 442.

In Step 442, the correction unit 28B determines whether the left eye image correction coefficient and the right eye image correction coefficient have been calculated for all of the first pixels L and all of the second pixels R in the pixel group of interest. Here, the pixel group of interest indicates the coefficient calculation pixel group $602_n$ which is set as the pixel group of interest in Step 432.

In case in which it is determined in Step 442 that the left eye image correction coefficient and the right eye image correction coefficient have not been calculated for all of the first pixels L and all of the second pixels R in the pixel group of interest, that is, the determination result is "No", the process proceeds to Step 434. In case in which it is determined in Step 442 that the left eye image correction coefficient and the right eye image correction coefficient have been calculated for all of the first pixels L and all of the second pixels R in the pixel group of interest, that is, the determination result is "Yes", the process proceeds to Step 444.

In Step 444, the correction unit 28B erases the maximum left eye image correction coefficient (maximum correction value) and the minimum left eye image correction coefficient (minimum correction value) from the left eye image correction coefficients stored in the first correction coefficient storage area 25B. In addition, the correction unit 28B erases the maximum right eye image correction coefficient (maximum correction value) and the minimum right eye image correction coefficient (minimum correction value) from the right eye image correction coefficients stored in the second correction coefficient storage area 25C.

Then, in Step 446, the correction unit 28B determines whether the process from Step 434 to Step 444 for all of the coefficient calculation pixel groups $602_n$ included in the rows 600 of interest set in Step 430 has ended. In case in which it is determined in Step 446 that the process from Step 434 to Step 444 for all of the coefficient calculation pixel groups $602_n$ included in the rows 600 of interest set in Step 430 has not ended, the determination result is "No" and the process proceeds to Step 432. In case in which it is determined in Step 446 that the process from Step 434 to Step 444 for all of the coefficient calculation pixel groups $602_n$ included in the rows 600 of interest set in Step 430 has ended, the determination result is "Yes" and the process proceeds to Step 448.

In Step 448, the correction unit 28B stores a value obtained by averaging the left eye image correction coefficients, which are stored in the first correction coefficient storage area 25B, for each coefficient calculation pixel group $602_n$ as the latest correction coefficient in the first use factor storage area 26A for each pixel. Here, the value obtained by averaging the left eye image correction coefficients for each coefficient calculation pixel group $602_n$ indicates, for example, the mean $X_1$ of the values obtained by excluding the maximum value and the minimum value from a proportion $A_0$, a proportion $A_1$, a proportion $A_2$, and a proportion $A_3$ for a pixel position corresponding to the proportion $A_0$ illustrated in FIG. 16. For the pixel positions corresponding to the proportion $A_1$, the proportion $A_2$, and the proportion $A_3$ illustrated in FIG. 16, the averaged value indicates a mean $Z_1$ ($=(3X_1+Y_1)/4$) which is calculated on the basis of the mean $X_1$ and a mean $Y_1$. The mean $Y_1$ indicates the mean of the values obtained by excluding the maximum value and the minimum value from a proportion $A_4$, a proportion $A_5$, a proportion $A_6$, and a proportion $A_7$ illustrated in FIG. 16. However, the averaged value is not limited to the mean $Z_1$. For example, for the pixel positions corresponding to the proportion $A_1$, the proportion $A_2$, and the proportion $A_3$ illustrated in FIG. 16, the averaged value may be a value which is obtained by an interpolation method using the mean $X_1$ and the mean $Y_1$.

The storage of the value obtained by averaging the left eye image correction coefficients for each coefficient calculation pixel group $602_n$ in the first use factor storage area 26A for each pixel means, for example, that the value obtained by averaging the left eye image correction coefficients for each coefficient calculation pixel group $602_n$ is stored for each coordinate value stored in the first correction coefficient storage area 25B.

In Step 448, the correction unit 28B stores a value obtained by averaging the right eye image correction coefficients, which are stored in the second correction coefficient storage area 25C, for each coefficient calculation pixel group $602_n$ as the latest correction coefficient in the second use factor storage area 26B for each pixel. The value obtained by averaging the right eye image correction coefficients for each coefficient calculation pixel group $602_n$ indicates, for example, the mean $X_2$ of the values obtained by excluding the maximum value and the minimum value from a proportion $B_0$, a proportion $B_1$, a proportion $B_2$, and a proportion $B_3$ for a pixel position corresponding to the proportion $B_o$ illustrated in FIG. 16. For the pixel positions corresponding to the proportion $B_1$, the proportion $B_2$, and the proportion $B_3$ illustrated in FIG. 16, the averaged value indicates a mean $Z_2$ ($=(3X_2+Y_2)/4$) which is calculated on the basis of the mean $X_2$ and the mean $Y_2$. The mean $Y_2$ indicates the mean of the values obtained by excluding the maximum value and the minimum value from a proportion $B_4$, a proportion $B_5$, a proportion $B_6$, and a proportion $B_7$ illustrated in FIG. 16. However, the averaged value is not limited to the mean $Z_2$. For example, for the pixel positions corresponding to the proportion $B_1$, the proportion $B_2$, and the proportion $B_3$ illustrated in FIG. 16, the averaged value may be a value which is obtained by an interpolation method using the mean $X_2$ and the mean $Y_2$.

As described above, in the imaging device 100A, a first averaging correction coefficient is calculated on the basis of the left eye image correction coefficients except for the minimum value and the maximum value among the left eye image correction coefficients which are obtained from the coefficient calculation pixel group $602_n$. In addition, a second averaging correction coefficient is calculated on the basis of the right eye image correction coefficients except for the minimum value and the maximum value among the right eye image correction coefficients which are obtained from the coefficient calculation pixel group $602_n$. Therefore, the imaging device 100A can obtain the first and second averaging correction coefficients which are smoothed with high accuracy, as compared to a case without having the above-mentioned structure.

In the second embodiment, the values obtained by averaging the left eye image correction coefficients and the right eye image correction coefficients except the maximum and minimum correction values for each coefficient calculation pixel group $602_n$ are used as the latest correction coefficients. For example, the medians or modes of the left eye image correction coefficients and the right eye image correction coefficients except the maximum and minimum correction values may be calculated for each coefficient calculation pixel group $602_n$ and the calculated medians or modes may be used as the latest correction coefficients.

Third Embodiment

In the first embodiment, the calculated left eye image correction coefficient and the calculated right eye image correction coefficient are stored in the storage areas, without any change. However, in a third embodiment, a case in which, when the calculated left eye image correction coefficient and the calculated right eye image correction coefficient is greater than an upper limit or less than a lower limit, a substitute value is stored in the storage area will be described. In the third embodiment, the same components as those in the first embodiment are denoted by the same reference numerals and the description thereof will not be repeated.

Figure 17A:
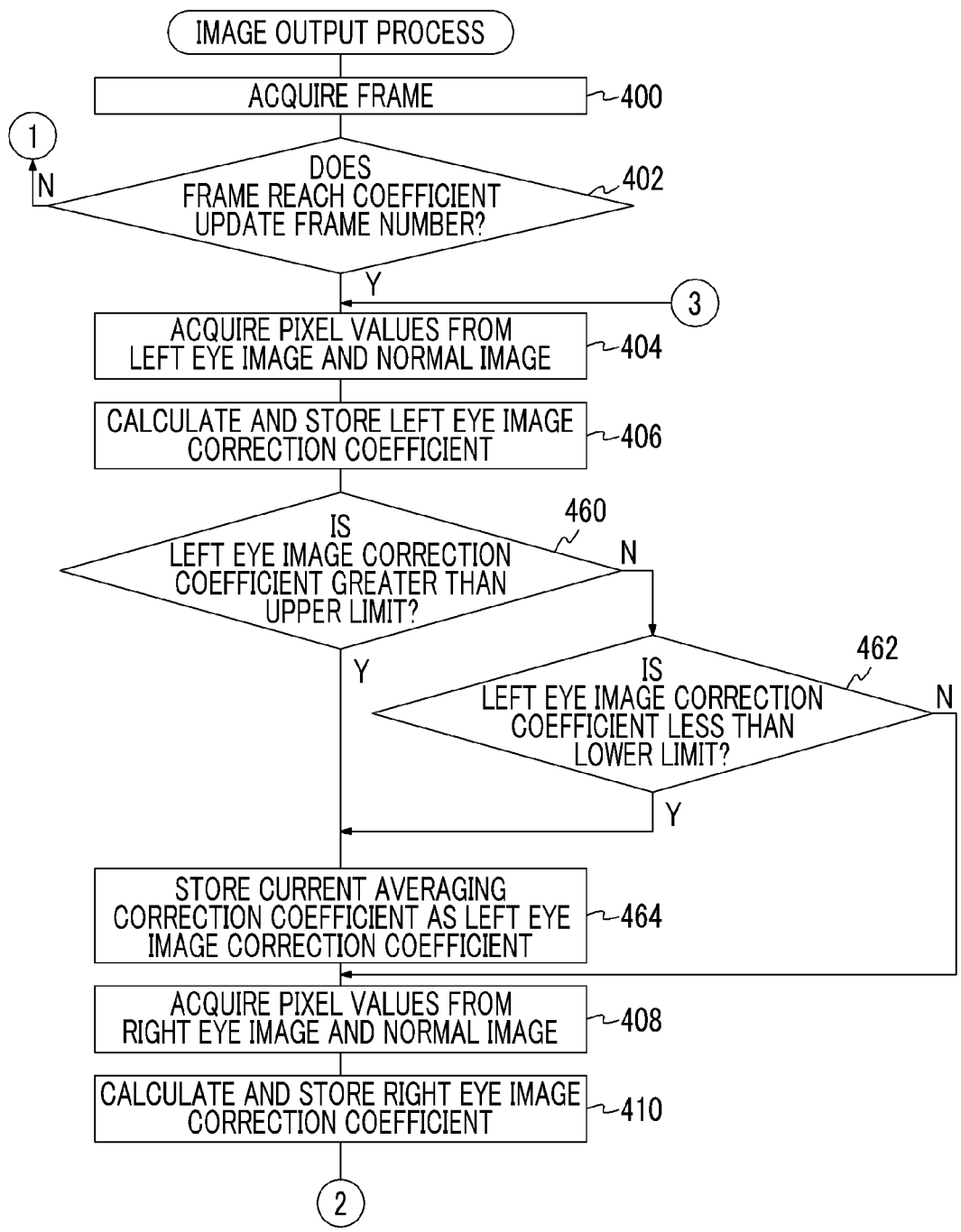
FIG. 17A is a flowchart illustrating an example of the flow of an image output process according to the third embodiment.
Figure 17B:
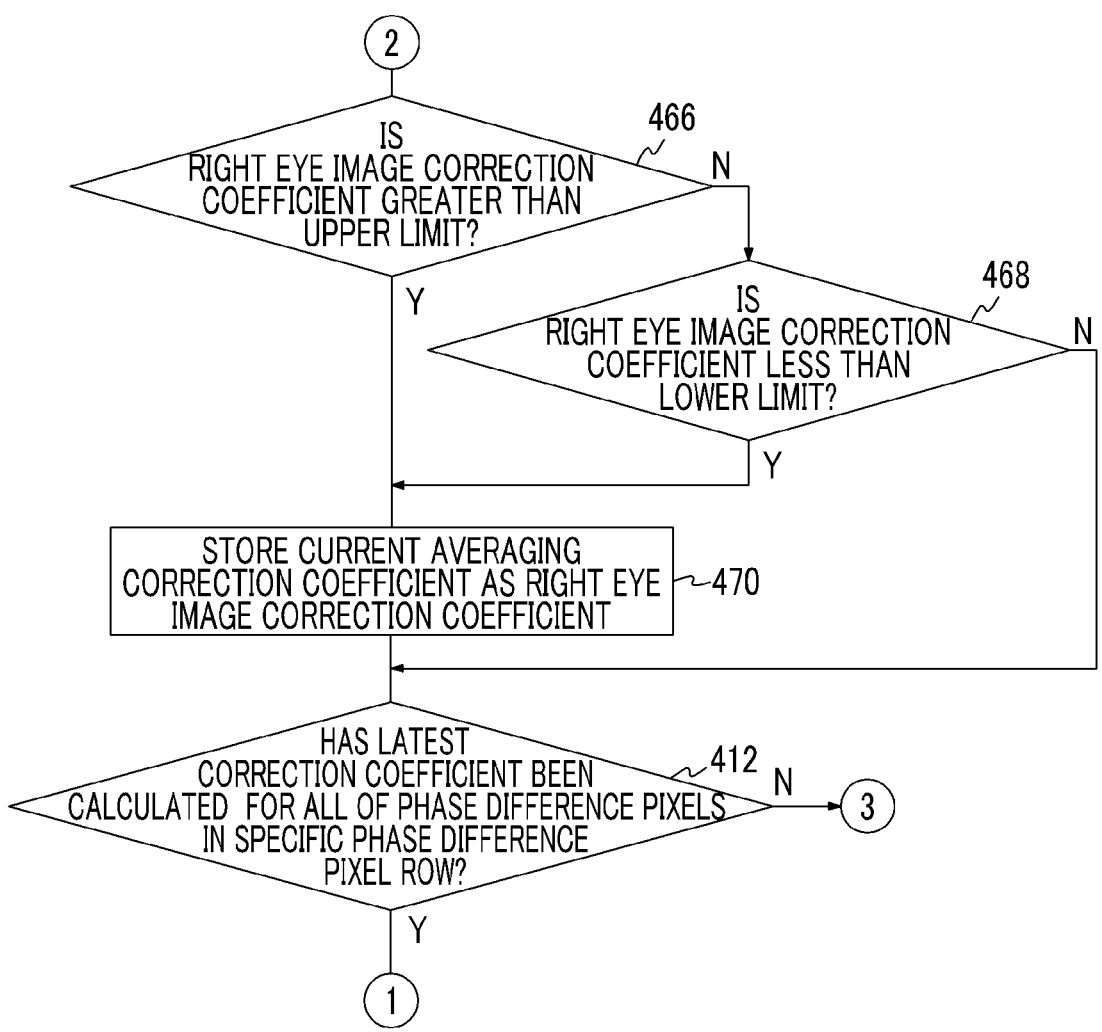
FIG. 17B is a flowchart subsequent to the flowchart illustrated in FIG. 17A.

An imaging device 100B according to the third embodiment differs from the imaging device 100 according to the first embodiment in that the image processing unit 28 performs an image output process illustrated in FIGS. 17A and 17B, instead of the image output process illustrated in FIG. 13. The image output process illustrated in FIGS. 17A and 17B differs from the image output process illustrated in FIG. 13 in that it includes Steps 430 to 448, instead of Steps 404 to 412. In addition, the image output process illustrated in FIGS. 17A and 17B differs from the image output process illustrated in FIG. 13 in that it includes Steps 460 to 470.

In the image output process illustrated in FIGS. 17A and 17B, in Step 460, the correction unit 28B determines whether the left eye image correction coefficient which has been stored in the first correction coefficient storage area 25B in Step 406 is greater than the upper limit. The upper limit may be a fixed value or a variable value (for example, a value which is customized according to an instruction received by the touch panel 216).

In case in which it is determined in Step 460 that the left eye image correction coefficient which has been stored in the first correction coefficient storage area 25B in Step 406 is equal to or less than the upper limit, that is, the determination result is "No", the process proceeds to Step 462. In case in which it is determined in Step 460 that the left eye image correction coefficient which has been stored in the first correction coefficient storage area 25B in Step 406 is greater than the upper limit, that is, the determination result is "Yes", the process proceeds to Step 464.

In Step 462, the correction unit 28B determines whether the left eye image correction coefficient which has been stored in the first correction coefficient storage area 25B in Step 406 is less than a lower limit. The lower limit is a value that is less than the upper limit. The lower limit may be a fixed value or a variable value (for example, a value which is customized according to an instruction received by the touch panel 216).

In case in which it is determined in Step 462 that the left eye image correction coefficient which has been stored in the first correction coefficient storage area 25B in Step 406 is equal to or greater than the lower limit, that is, the determination result is "No", the process proceeds to Step 408. In case in which it is determined in Step 462 that the left eye image correction coefficient which has been stored in the first correction coefficient storage area 25B in Step 406 is less than the lower limit, that is, the determination result is "Yes", the process proceeds to Step 464.

In Step 464, the correction unit 28B stores (overwrites and saves) the current first averaging correction coefficient for a corresponding pixel position as a new left eye image correction coefficient in the first correction coefficient storage area 25B, instead of the left eye image correction coefficient which is stored in the first correction coefficient storage area 25B in Step 406. The current first averaging correction coefficient for the corresponding pixel position indicates a first averaging correction coefficient for a pixel position corresponding to the pixel position where the pixel value used to calculate the left eye image correction coefficient is acquired in Step 406 among the first averaging correction coefficients stored in the first use factor storage area 26A.

In Step 466, the correction unit 28B determines whether the right eye image correction coefficient which has been stored in the second correction coefficient storage area 25C in Step 410 is greater than an upper limit. In case in which it is determined in Step 466 that the right eye image correction coefficient which has been stored in the second correction coefficient storage area 25C in Step 410 is equal to or less than the upper limit, that is, the determination result is "No", the process proceeds to Step 468. In case in which it is determined in Step 466 that the right eye image correction coefficient which has been stored in the second correction coefficient storage area 25C in Step 410 is greater than the upper limit, that is, the determination result is "Yes", the process proceeds to Step 470.

In Step 468, the correction unit 28B determines whether the right eye image correction coefficient which has been stored in the second correction coefficient storage area 25C in Step 410 is less than a lower limit. In case in which it is determined in Step 468 that the right eye image correction coefficient which has been stored in the second correction coefficient storage area 25C in Step 410 is equal to or greater than the lower limit, that is, the determination result is "No", the process proceeds to Step 476. In case in which it is determined in Step 468 that the right eye image correction coefficient which has been stored in the second correction coefficient storage area 25C in Step 410 is less than the lower limit, that is, the determination result is "Yes", the process proceeds to Step 470.

In Step 470, the correction unit 28B stores (overwrites and saves) the current second averaging correction coefficient for the corresponding pixel position as a new right eye image correction coefficient in the second correction coefficient storage area 25B, instead of the right eye image correction coefficient which is stored in the second correction coefficient storage area 25C in Step 410. The current second averaging correction coefficient for the corresponding pixel position indicates a second averaging correction coefficient for a pixel position corresponding to the pixel position where the pixel value used to calculate the right eye image correction coefficient is acquired in Step 410 among the second averaging correction coefficients stored in the second use factor storage area 26B.

As described above, in the imaging device 100B according to the third embodiment, the left eye image correction coefficient that is greater than the upper limit calculated on the basis of the subsequent frame of a pair of frames is replaced with the first averaging correction coefficient used to correct the shading characteristics of the preceding frame. In addition, the right eye image correction coefficient that is greater than the upper limit calculated on the basis of the subsequent frame of the pair of frames is replaced with the second averaging correction coefficient used to correct the shading characteristics of the preceding frame. Therefore, the imaging device 100B can obtain the first and second averaging correction coefficients which are smoothed with high accuracy, as compared to a case without the above-mentioned structure.

Figure 19:
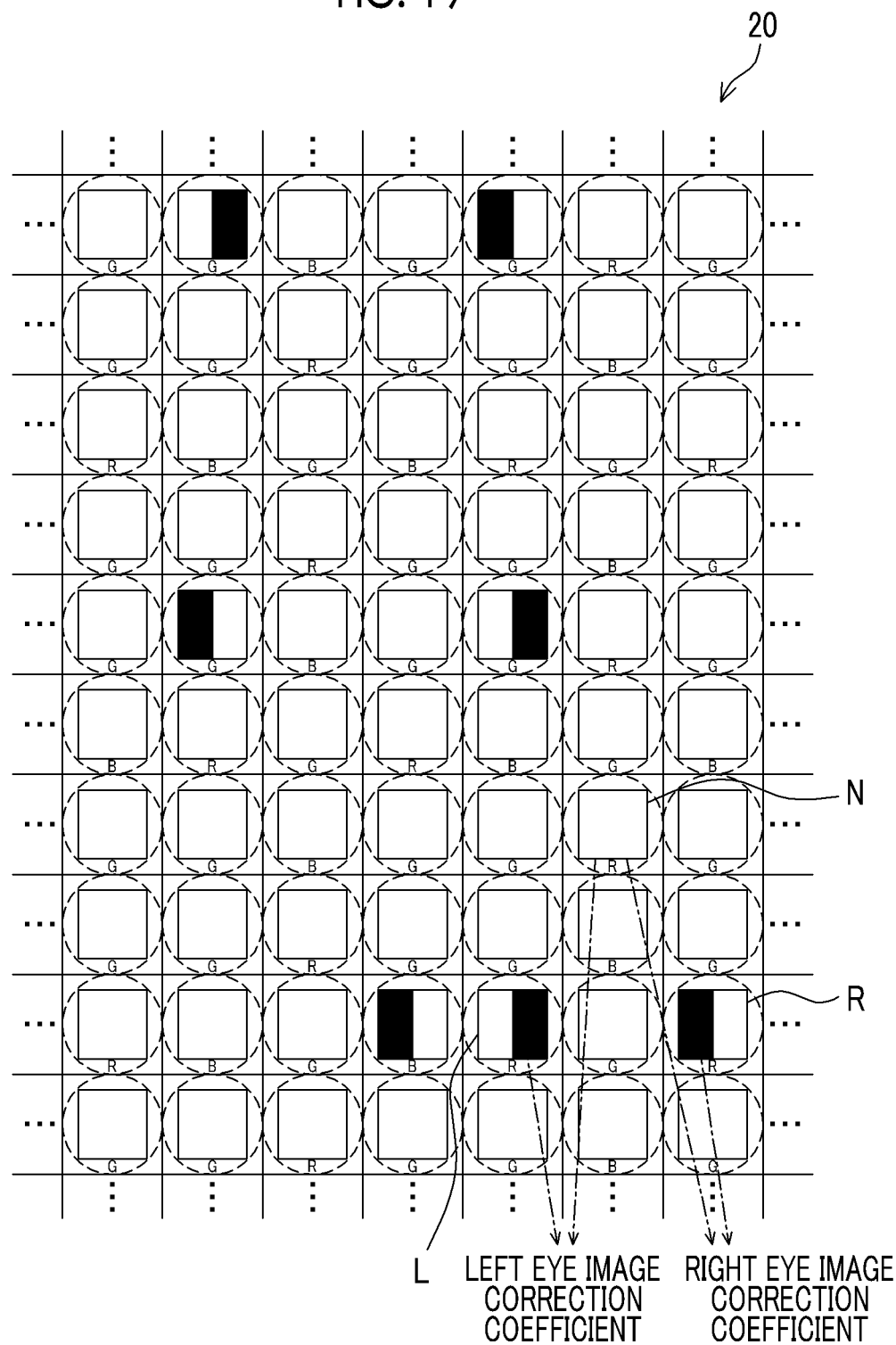
FIG. 19 is a diagram schematically illustrating an example of a pixel array in which a G filter and an R filter are allocated to phase difference pixels in the imaging element included in the imaging device according to the first to third embodiments.

In each of the above-described embodiments, the G filter is allocated to the phase difference pixel. However, the invention is not limited thereto. For example, as illustrated in FIG. 19, in case in which the R filter is allocated to the first pixel L, the left eye image correction coefficient may be calculated from the value of the first pixel L to which the R filter is allocated and the value of the normal pixel N which is closest to the first pixel L. For example, as illustrated in FIG. 19, in case in which the R filter is allocated to the second pixel R, the right eye image correction coefficient may be calculated from the value of the second pixel R to which the R filter is allocated and the value of the normal pixel N which is closest to the second pixel R. In case in which the B filters are allocated to the first pixel L and the second pixel R, the left eye image correction coefficient and the right eye image correction coefficient may be calculated by the same method as described above. As such, the left eye image correction coefficient and the right eye image correction coefficient are calculated using the values of the phase difference pixel and the normal pixel N having the same color sensitivity. Therefore, even when the phase difference pixels have different sensitivities to colors, it is possible to correct the shading characteristics with high accuracy.

Fourth Embodiment

In each of the above-described embodiments, the imaging devices 100, 100A, and 100B are given as an example. However, for example, a mobile phone or a smart phone with a camera function may be given as an example of a portable terminal apparatus which is a modification example of the imaging devices 100, 100A, and 100B. In addition, for example, a personal digital assistant (PDA) or a portable game machine is given as an example of the portable terminal apparatus. In the fourth embodiment, the smart phone will be described in detail as an example with reference to the drawings.

Figure 20:
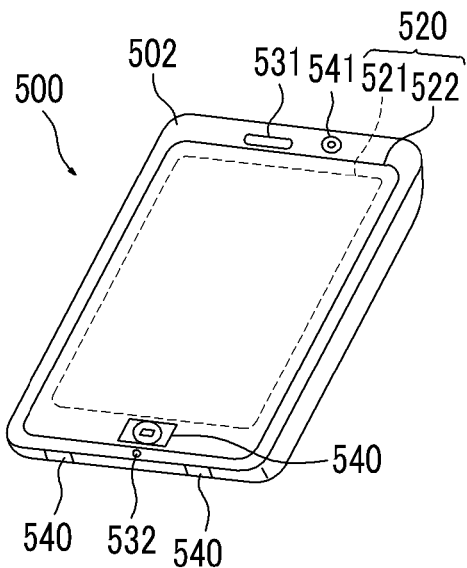
FIG. 20 is a perspective view illustrating an example of the outward appearance of a smart phone according to a fourth embodiment.

FIG. 20 is a perspective view illustrating an example of the outward appearance of a smart phone 500. The smart phone 500 illustrated in FIG. 20 includes a housing 502 with a flat panel shape and a display input unit 520 having a display panel 521 as a display unit and an operation panel 522 as an input unit which are integrally formed on one surface of the housing 502. The housing 502 includes a speaker 531, a microphone 532, an operating unit 540, and a camera unit 541. However, the configuration of the housing 502 is not limited thereto. For example, the display unit and the input unit may be independently provided, or the housing 502 may have a folding structure or a sliding mechanism.

Figure 21:
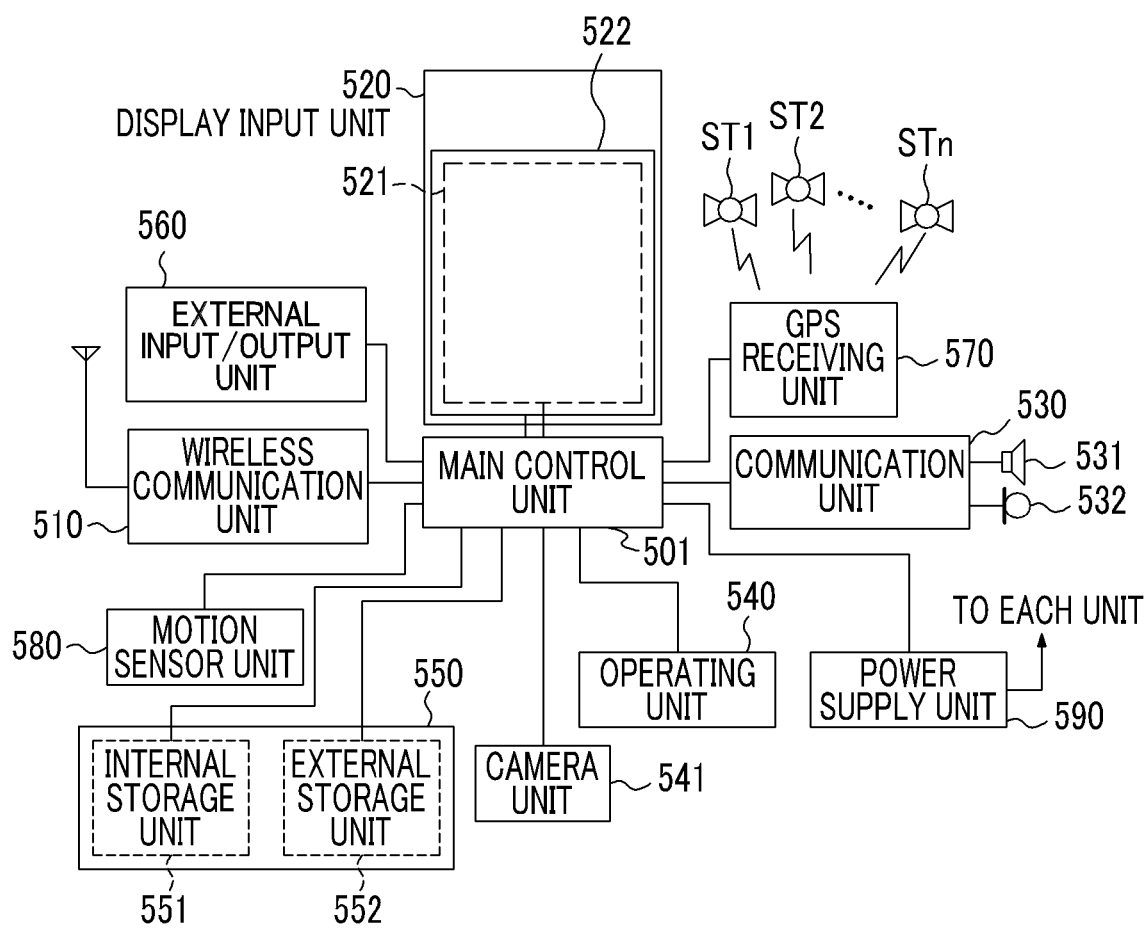
FIG. 21 is a block diagram illustrating an example of the structure of a main portion of an electrical system of the smart phone according to the fourth embodiment.

FIG. 21 is a block diagram illustrating an example of the structure of the smart phone 500 illustrated in FIG. 20. As illustrated in FIG. 21, the smart phone 500 includes, as main components, a wireless communication unit 510, the display input unit 520, a communication unit 530, the operating unit 540, the camera unit 541, a storage unit 550, and an external input/output unit 560. In addition, the smart phone 500 includes, as main components, a global positioning system (GPS) receiving unit 570, a motion sensor unit 580, a power supply unit 590, and a main control unit 501. The smart phone 500 has, as a main function, a wireless communication function which performs mobile wireless communication through a base station apparatus BS and a mobile communication network NW.

The wireless communication unit 510 performs wireless communication with the base station apparatus BS which is accommodated in the mobile communication network NW in response to an instruction from the main control unit 501. The wireless communication is used to transmit and receive various types of file data, such as voice data and image data, and electronic mail data or to receive, for example, web data and streaming data.

The display input unit 520 is a so-called touch panel and includes the display panel 521 and the operation panel 522. Therefore, the display input unit 520 displays, for example, images (still images and moving images) or text information to visually transmit information to the user and detects the user's operation for the displayed information under the control of the main control unit 501. It is preferable that the display panel 521 is a 3D display panel in case in which a generated 3D image is viewed.

The display panel 521 uses, for example, a liquid crystal display (LCD) or an organic electro-luminescence display (OELD) as a display device. The operation panel 522 is a device that is provided such that an image displayed on a display surface of the display panel 521 is visually recognized and detects one or a plurality of coordinate points selected by a finger of the user or a stylus. When the device is operated by a finger of the user or a stylus, a detection signal which is generated by the operation is output to the main control unit 501. Then, the main control unit 501 detects an operation position (coordinates) on the display panel 521 on the basis of the received detection signal.

As illustrated in FIG. 21, the display panel 521 and the operation panel 522 of the smart phone 500 are integrated to form the display input unit 520 and the operation panel 522 is arranged so as to completely cover the display panel 521. In case in which this arrangement is used, the operation panel 522 may have a function of detecting the user's operation even in a region other than the display panel 521. In other words, the operation panel 522 may include a detection region (hereinafter, referred to as a display region) for an overlap portion which overlaps the display panel 521 and a detection region (hereinafter, referred to as a non-display region) for an outer edge portion which does not overlap the display panel 521.

The size of the display region may be exactly equal to the size of the display panel 521. However, the sizes are not necessarily equal to each other. The operation panel 522 may include two sensitive regions, that is, an outer edge portion and an inner portion other than the outer edge portion. The width of the outer edge portion is appropriately designed according to, for example, the size of the housing 502. Examples of a position detecting method which is used in the operation panel 522 include a matrix switching method, a resistive film method, a surface elastic wave method, an infrared method, an electromagnetic induction method, and a capacitive sensing method. Any of the methods may be used.

The communication unit 530 includes the speaker 531 and the microphone 532. The communication unit 530 converts the voice of the user which is input through the microphone 532 into voice data which can be processed by the main control unit 501 and outputs the converted voice data to the main control unit 501. In addition, the communication unit 530 decodes voice data received by the wireless communication unit 510 or the external input/output unit 560 and outputs the decoded voice data from the speaker 531. As illustrated in FIG. 21, for example, the speaker 531 can be mounted on the same surface as the display input unit 520 and the microphone 532 can be mounted on a lower portion of the front surface of the housing 502.

The operating unit 540 is a hardware key which uses, for example, a key switch and receives instructions from the user. For example, as illustrated in FIG. 20, the operating unit 540 is a push button switch which is mounted on the lower portion of the front surface of the housing 502 of the smart phone 500, is turned on when it is pressed by, for example, a finger, and is turned off by the restoring force of a spring when the finger is taken off.

The storage unit 550 stores a control program or control data of the main control unit 501, application software, address data which is associated with, for example, the names or phone numbers of communication partners, and transmitted and received electronic mail data. In addition, the storage unit 550 stores web data which is downloaded by web browsing or downloaded content data. In addition, the storage unit 550 temporarily stores, for example, streaming data. The storage unit 550 includes an internal storage unit 551 which is provided in the smart phone and an external storage unit 552 which has a detachable external memory slot. The internal storage unit 551 and the external storage unit 552 forming the storage unit 550 may be implemented by a storage medium, such as a flash memory or a hard disk. Examples of the storage medium can include a multimedia-card-micro-type memory, a card-type memory (for example, a MicroSD (registered trademark) memory), a random access memory (RAM), and a read only memory (ROM).

The external input/output unit 560 functions as an interface with all of the external apparatuses connected to the smart phone 500 and is directly or indirectly connected to other external apparatuses by communication or a network. Examples of the communication with other external apparatuses include universal serial bus (USB) communication and IEEE1394. Examples of the network include the Internet, a wireless LAN, a Bluetooth (registered trademark) network, a radio frequency identification (RFID) network, and an infrared data association (IrDA (registered trademark)) network. In addition, other examples of the network include an ultra wideband (UWB: registered trademark) network and a ZigBee (registered trademark) network.

Examples of the external apparatus connected to the smart phone 500 include a wired/wireless headset, a wired/wireless external charger, a wired/wireless data port, and a memory card which is connected through a card socket. Other examples of the external apparatus include a subscriber identity module (SIM) card/user identity module (UIM) card and an external audio/video apparatus which is connected through an audio/video input/output (I/O) terminal. In addition to the external audio/video apparatus, a wirelessly connected external audio/video apparatus may be given as an example of the external apparatus. For example, a smart phone which is connected wirelessly or in a wired manner, a personal computer which is connected wirelessly or in a wired manner, a PDA which is connected wirelessly or in a wired manner, and an earphone which is connected wirelessly or in a wired manner, can be applied, instead of the external audio/video apparatus.

The external input/output unit 560 can transmit data which is received from the external apparatus to each component of the smart phone 500 or can transmit data in the smart phone 500 to the external apparatus.

The GPS receiving unit 570 receives GPS signals transmitted from GPS satellites ST1 to STn and performs a position measurement process on the basis of the received GPS signals to detect a position including the latitude, longitude, and height of the smart phone 500, in response to an instruction from the main control unit 501. When the GPS receiving unit 570 can acquire positional information from the wireless communication unit 510 or the external input/output unit 560 (for example, the wireless LAN), it can detect the position using the positional information.

The motion sensor unit 580 includes, for example, a triaxial acceleration sensor and detects the physical movement of the smart phone 500 in response to an instruction from the main control unit 501. When the physical movement of the smart phone 500 is detected, the moving direction or acceleration of the smart phone 500 is detected. The detection result is output to the main control unit 501.

The power supply unit 590 supplies power which is stored in a battery (not illustrated) to each unit of the smart phone 500 in response to an instruction from the main control unit 501.

The main control unit 501 includes a microprocessor, operates on the basis of the control program or control data stored in the storage unit 550, and controls the overall operation of each unit of the smart phone 500. The main control unit 501 has an application processing function and a mobile communication control function of controlling each unit of a communication system in order to perform voice communication or data communication through the wireless communication unit 510.

The application processing function is implemented by the operation of the main control unit 501 based on the application software which is stored in the storage unit 550. Examples of the application processing function include an infrared communication function which controls the external input/output unit 560 such that data communication with an opposing apparatus is performed, an electronic mail function which transmits and receives electronic mail, and a web browsing function which browses web pages.

The main control unit 501 has, for example, an image processing function which displays an image on the display input unit 520 on the basis of image data (still image or moving image data) such as received data or downloaded streaming data. The image processing function means the function of the main control unit 501 decoding the image data, performing image processing on the decoding result, and displaying the image on the display input unit 520.

The main control unit 501 performs display control for the display panel 521 and operation detection control for detecting the operation of the user through the operating unit 540 and the operation panel 522.

The main control unit 501 performs the display control to display a software key, such as an icon for starting application software or a scroll bar, or to display a window for creating electronic mail. The scroll bar means a software key for receiving an instruction to move a displayed portion of an image that is too large to fit into the display region of the display panel 521.

The main control unit 501 performs the operation detection control to detect the operation of the user input through the operating unit 540 or to receive an operation for the icon or the input of a character string to an input field of the window through the operation panel 522. In addition, the main control unit 501 performs the operation detection control to receive a request to scroll the displayed image through the scroll bar.

In addition, the main control unit 501 performs the operation detection control to determine whether the position of an operation for the operation panel 522 is an overlap portion (display region) which overlaps the display panel 521 or an outer edge portion (non-display region) which does not overlap the display panel 521 other than the overlap portion. The main control unit 501 has a touch panel control function that receives the determination result and controls a sensitive region of the operation panel 522 or the display position of the software key.

The main control unit 501 can detect a gesture operation for the operation panel 522 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 541 is a digital camera which captures an image using an imaging element, such as a CMOS or a CCD, and has the same functions as the imaging device 100 illustrated in FIG. 1.

The camera unit 541 can switch the operation mode between the manual focus mode and the automatic focus mode. When the manual focus mode is selected, the user can operate, for example, a focus icon button displayed on the operating unit 540 or the display input unit 520 to focus the imaging lens of the camera unit 541. In the manual focus mode, a live view image having a split image combined therewith is displayed on the display panel 521 such that the user can check a focus state in the manual focus mode. In addition, the hybrid finder 220 illustrated in FIG. 10 may be provided in the smart phone 500.

The camera unit 541 converts captured image data into image data which is compressed in, for example, a joint photographic coding experts group (JPEG) format under the control of the main control unit 501. Then, the camera unit 541 records the converted image data in the storage unit 550 or outputs the converted image data through the external input/output unit 560 or the wireless communication unit 510. As illustrated in FIG. 21, the camera unit 541 is mounted on the same surface as the display input unit 520 in the smart phone 500. However, the mounting position of the camera unit 541 is not limited thereto. For example, the camera unit 541 may be mounted on the rear surface of the display input unit 520 or a plurality of camera units 541 may be mounted. In case in which a plurality of camera units 541 are mounted, the camera units 541 which are used to capture images may be switched such that a single camera unit captures images or the plurality of camera units 541 may be simultaneously used to capture images.

The camera unit 541 can be used for various functions of the smart phone 500. For example, the image captured by the camera unit 541 can be displayed on the display panel 521 or the image captured by the camera unit 541 can be used as one of the operation inputs of the operation panel 522. When the GPS receiving unit 570 detects the position, the position may be detected with reference to the image from the camera unit 541. In addition, the optical axis direction of the camera unit 541 in the smart phone 500 may be determined or the current usage environment may be determined, with reference to the image from the camera unit 541, using the triaxial acceleration sensor or without using the triaxial acceleration sensor. Of course, the image from the camera unit 541 may be used in the application software.

For example, various kinds of information may be added to the image data of a still image or a moving image and the image data may be stored in the storage unit 550 or may be output through the external input/output unit 560 or the wireless communication unit 510. The "various kinds of information" include the positional information which is acquired by the GPS receiving unit 570 and the voice information which is acquired by the microphone 532 (for example, the main control unit may convert the voice information into text information using voice-text conversion). In addition, the "various kinds of information" include, for example, the posture information which is acquired by the motion sensor unit 580.

In each of the above-described embodiments, the split image which is divided into two images in the up-down direction. However, the invention is not limited thereto. The split image may be divided into a plurality of images in the left-right direction or the oblique direction.

Figure 22:
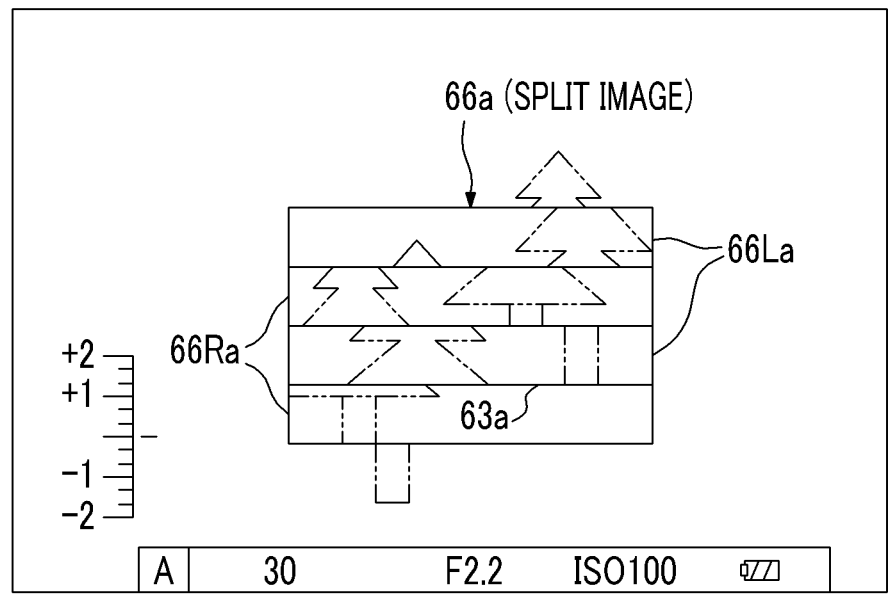
FIG. 22 is a diagram schematically illustrating a modification example of the split image according to the first to fourth embodiments in which a first image and a second image are divided into odd-numbered lines and even-numbered lines and the odd-numbered lines and the even-numbered lines are alternately arranged.

For example, a split image 66a illustrated in FIG. 22 is divided into odd-numbered lines and even-numbered lines by a plurality of boundary lines 63a which are parallel to each other in the row direction. In the split image 66a, a linear (for example, a strip-shaped) phase difference image 66La which is generated on the basis of an output signal from the first pixel group is displayed in the odd-numbered line (can also be displayed in the even-numbered line). In addition, a linear (for example, a strip-shaped) phase difference image 66Ra which is generated on the basis of an output signal from the second pixel group is displayed in the even-numbered line.

Figure 23:
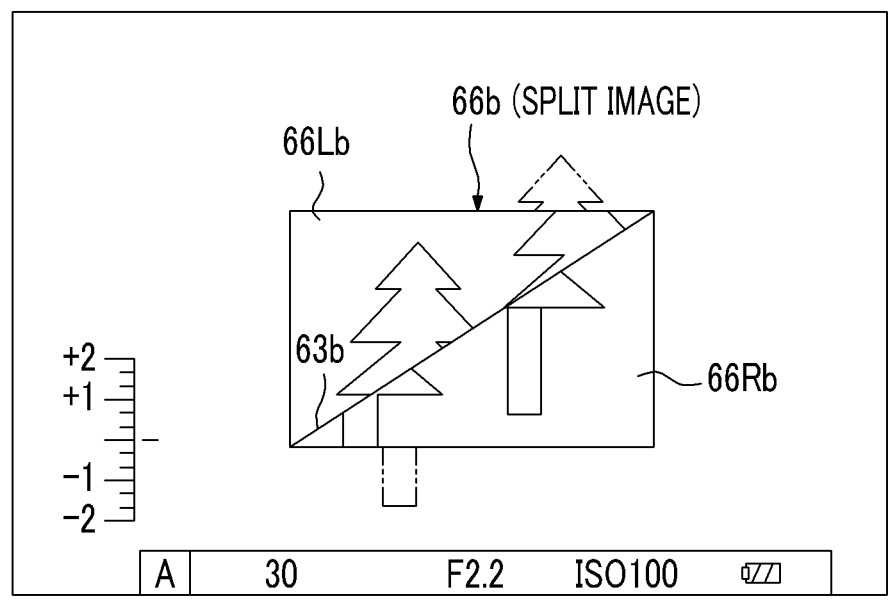
FIG. 23 is a diagram schematically illustrating a modification example of the split image according to the first to fourth embodiments which is divided by an oblique boundary line that is inclined with respect to a row direction.

A split image 66b illustrated in FIG. 23 is divided into two images by a boundary line 63b (for example, a diagonal line of the split image 66b) which has an angle of inclination in the row direction. In the split image 66b, a phase difference image 66Lb which is generated on the basis of an output signal from the first pixel group is displayed in one region. In addition, a phase difference image 66Rb which is generated on the basis of an output signal from the second pixel group is displayed in the other region.

Figure 24A:
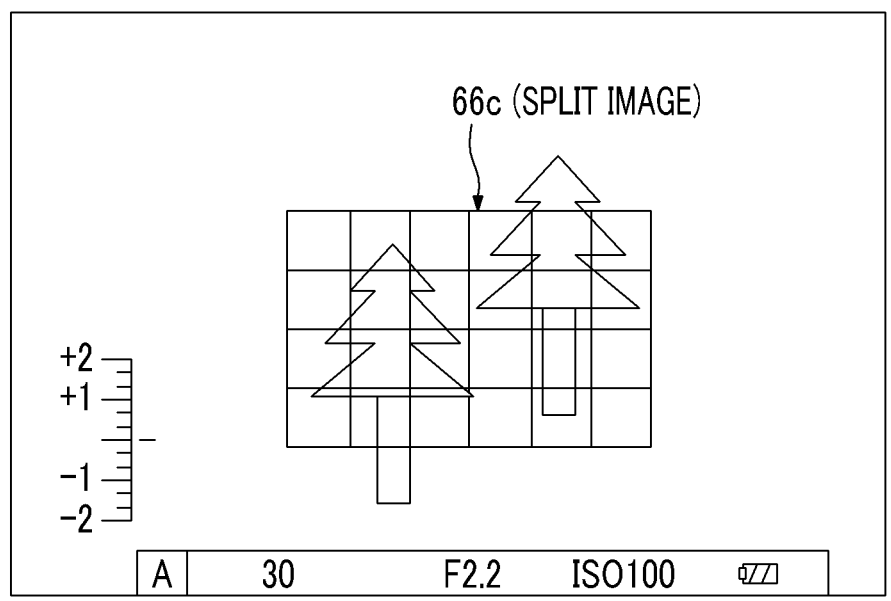
FIG. 24A is a diagram schematically illustrating a modification example of the split image according to the first to fourth embodiments which is divided by lattice-shaped boundary lines.
Figure 24B:
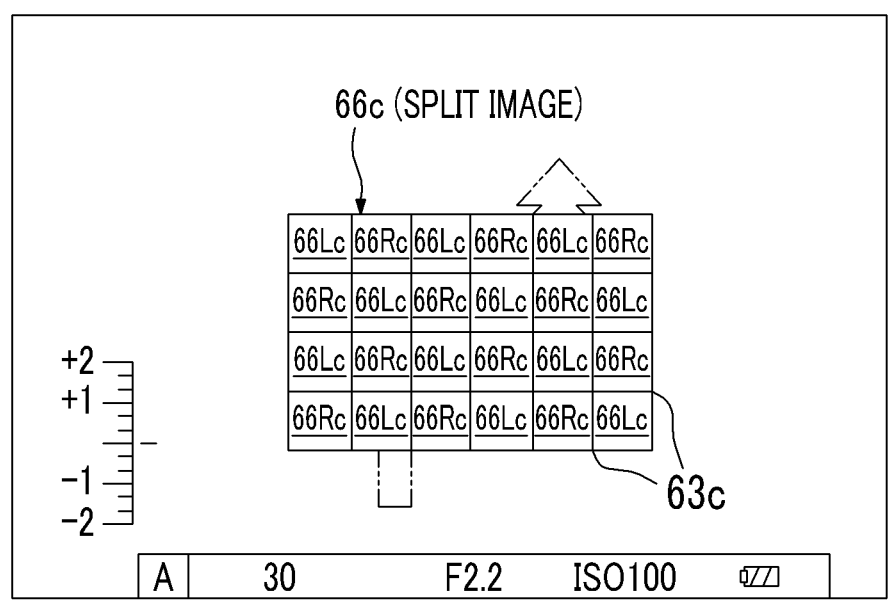
FIG. 24B is a diagram schematically illustrating a modification example of the split image according to the first to fourth embodiments which is formed in a checkered pattern.

A split image 66c illustrated in FIGS. 24A and 24B is divided by lattice-shaped boundary lines 63c which are parallel in the row direction and the column direction. In the split image 66c, phase difference images 66Lc which are generated on the basis of an output signal from the first pixel group are arranged in a checkered pattern and then displayed. In addition, phase difference images 66Rc which are generated on the basis of an output signal from the second pixel group are arranged in a checkered pattern and then displayed.

The split image is not limited thereto. A different focus check image may be generated from two phase difference images and then displayed. For example, two phase difference images may be superimposed and a composite image may be displayed. In case in which the image is out of focus, it may be displayed as a double image. When the image is in focus, it may be clearly displayed.

In each of the above-described embodiments, the imaging element 20 includes the first to third pixel groups. However, the invention is not limited thereto. For example, the imaging element may include only the first pixel group and the second pixel group. A digital camera including this type of imaging element can generate a three-dimensional image (3D image) on the basis of the first image output from the first pixel group and the second image output from the second pixel group and can also generate a two-dimensional image (2D image). In this case, the two-dimensional image can be generated by, for example, performing an interpolation process between the pixels of the same color in the first image and the second image. In addition, the first image or the second image may be used as the two-dimensional image, without performing the interpolation process.

In each of the above-described embodiments, in case in which the first to third images are input to the image processing unit 28, both the normal image and the split image are displayed on the same screen of the display device at the same time. However, the invention is not limited thereto. For example, the display control unit 36 may perform control such that the continuous display of the normal images as a moving image on the display device is prevented and the split images are continuously displayed as a moving image on the display device. Here, the term "preventing the display of the normal image" means, for example, that no normal image is displayed on the display device. Specifically, the term "preventing the display of the normal image" means that the normal image is generated, but is not output and displayed on the display device or that the normal image is not generated and displayed on the display device. The entire screen of the display device may be used to display the split image. For example, the entire display region of the split image illustrated in FIG. 9 may be used to display the split image. Here, an example of the "split image" can be a split image based on the image output from the phase difference pixel group (for example, the first image output from the first pixel group and the second image output from the second pixel group) in case in which a specific imaging element is used. An example of the "case in which the specific imaging element is used" is a case in which an imaging element including only the phase difference pixel group (for example, the first pixel group and the second pixel group) is used. Another example of the "case in which the specific imaging element is used" can be a case in which an imaging element in which the ratio of the phase difference pixels (for example, the first pixel group and the second pixel group) to the normal pixels is a predetermined value is used.

Various conditions are considered as the conditions for preventing the display of the normal image and displaying the split image. For example, in case in which an instruction to display the normal image is cancelled with the display of the split image being instructed, the display control unit 36 may perform control such that the display device does not display the normal image and display the split image. In addition, for example, in case in which the user looks through the hybrid finder, the display control unit 36 may perform control such that the display device does not display the normal image and displays the split image. For example, in case in which the release button 211 is in the halfway pressed state, the display control unit 36 may perform control such that the normal image is not displayed on the display device and the split image is displayed on the display device. For example, in case in which an operation of pressing the release button 211 is not performed, the display control unit 36 may perform control such that the display device does not display the normal image and displays the split image. For example, in case in which a face detection function which detects the face of the object is performed, the display control unit 36 may perform control such that the display device does not display the normal image and displays the split image. Here, the modification example in which the display control unit 36 prevents the display of the normal image has been described. However, the invention is not limited thereto. For example, the display control unit 36 may perform control such that the entire split image is overwritten on the normal image.

In each of the above-described embodiments, for example, as illustrated in FIG. 5, the imaging element 20 in which each of the first pixel L and the second pixel R is provided as a single pixel is given as an example. However, the invention is not limited thereto. For example, an imaging element 700 illustrated in FIG. 25 may be used. The imaging element 700 differs from the imaging element 20 in that a set of the first pixel L (for example, a photodiode on which light for a left eye image is incident) and second pixel R (for example, a photodiode on which light for a right eye image is incident) is provided in each pixel. In the example illustrated in FIG. 25, each pixel has a microlens 702 and the first pixel L and the second pixel R in each pixel are arranged such that light is incident on the first pixel L and the second pixel R through the microlens 702. For example, the first to fourth reading patterns can be given as an example of a pixel signal reading pattern of each pixel. The first reading pattern indicates a pattern in which a pixel signal is read from only the first pixel L. The second reading pattern indicates a pattern in which a pixel signal is read from only the second pixel R. The third reading pattern indicates a pattern in which pixel signals are read from each of the first pixel L and the second pixel R through each route (for example, a signal line provided in each pixel) at the same time. The fourth reading pattern indicates a pattern in which pixel signals from the first pixel L and the second pixel R are read as a pixel signal from a normal pixel through one signal line provided in each pixel. The pixel signal from the normal pixel indicates, for example, a pixel signal obtained by adding the pixel signal from the first pixel L and the pixel signal from the second pixel R in one pixel (for example, the amount of charge obtained by adding charge from the photodiode of the first pixel L and charge from the photodiode of the second pixel R).

Figure 25:
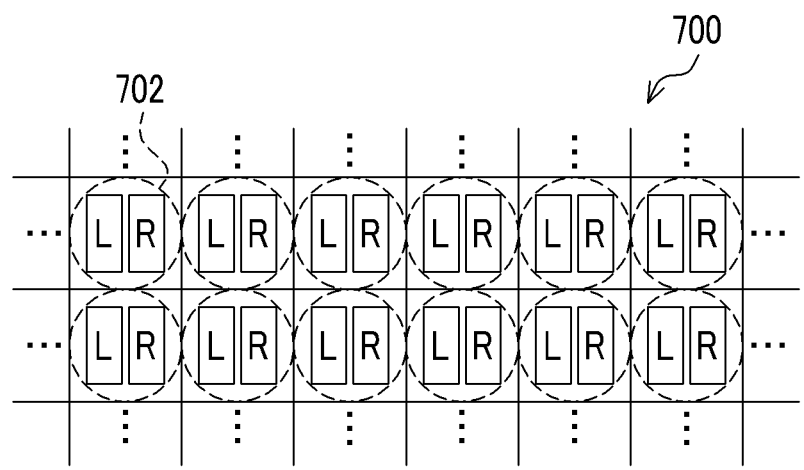
FIG. 25 is a diagram schematically illustrating a modification example of the arrangement of the first pixels and the second pixels included in the imaging element.

In the example illustrated in FIG. 25, one first pixel L and one second pixel R are provided in one pixel. However, the invention is not limited thereto. For example, at least one first pixel L and at least one second pixel R may be provided in one pixel. In the example illustrated in FIG. 25, the first pixel L and the second pixel R are arranged in one pixel in the horizontal direction. However, the invention is not limited thereto. The first pixel L and the second pixel R may be arranged in the vertical direction. Alternatively, the first pixel L and the second pixel R may be arranged in an oblique direction.

EXPLANATION OF REFERENCES

16: imaging lens
20, 700: imaging element
100, 100A, 100B: imaging device
28A: acquisition unit
28B: correction unit
28C: control unit

What is claimed is:
1. An image processing device comprising:
an acquisition unit that acquires a captured image including a first image based on a first image signal, which is obtained from an object image that passes through a pair of regions of an imaging lens, is pupil-divided, and is formed, and a second image based on a second image signal corresponding to an image signal, which is obtained from an object image that passes through the imaging lens, without being pupil-divided, and is formed, the first image signal and the second image signal being output from an imaging element including a phase difference pixel group that outputs the first image signal;
a correction unit that calculates a shading characteristic correction coefficient on the basis of a first comparison result between the first image and the second image included in an early-acquired image which is acquired first of a pair of captured images acquired at different times by the acquisition unit and a second comparison result between the first image and the second image included in a late-acquired image which is acquired later than the early-acquired image of the pair of captured images, and corrects shading characteristics of the late-acquired image on the basis of the calculated shading characteristic correction coefficient;
a display unit that displays an image; and
a control unit that directs the display unit to continuously display the second image included in the early-acquired image and the second image included in the late-acquired image, of which the shading characteristics have been corrected by the correction unit, as a moving image, and to display an image based on the first image included in the early-acquired image and an image based on the first image included in the late-acquired image, of which the shading characteristics have been corrected by the correction unit, as a moving image for checking a focus in a display region of the second image.

2. The image processing device according to claim 1, wherein the shading characteristic correction coefficient is obtained by averaging the first comparison result and the second comparison result.

3. The image processing device according to claim 2, wherein the shading characteristic correction coefficient is obtained by averaging the first comparison result to which a first weight is given and the second comparison result to which a second weight that is less than the first weight is given.

4. The image processing device according to claim 2, wherein the shading characteristic correction coefficient is obtained by averaging the first comparison result to which a first weight is given and the second comparison result to which a second weight that is equal to or greater than the first weight is given.

5. The image processing device according to claim 2, wherein the first comparison result is a value that is based on a first comparison value between pixel values of the first image and the second image included in the early-acquired image at corresponding pixel positions, and
the second comparison result is a value that is based on a second comparison value between pixel values of the first image and the second image included in the late-acquired image at corresponding pixel positions.

6. The image processing device according to claim 1, wherein the first comparison result is a value that is based on a first comparison value between pixel values of the first image and the second image included in the early-acquired image at corresponding pixel positions, and
the second comparison result is a value that is based on a second comparison value between pixel values of the first image and the second image included in the late-acquired image at corresponding pixel positions.

7. The image processing device according to claim 6, wherein the shading characteristic correction coefficient is obtained on the basis of a value which is based on the first comparison values except for at least one of a minimum value or a maximum value among the first comparison values and a value which is based on the second comparison values except for at least one of a minimum value or a maximum value among the second comparison values at every three or more pixel positions of the imaging element in a pupil division direction.

8. The image processing device according to claim 6, wherein, in case in which the second comparison value is greater than an upper limit, the correction unit changes the second comparison value greater than the upper limit to a value that corresponds to the first comparison value at a pixel position corresponding to the pixel position at which the second comparison value greater than the upper limit is obtained, and
in case in which the second comparison value is less than a lower limit, the correction unit changes the second comparison value less than the lower limit to a value that corresponds to the first comparison value at a pixel position corresponding to the pixel position at which the second comparison value less than the lower limit is obtained.

9. The image processing device according to claim 6, wherein the imaging element has sensitivity to colors which are allocated to each pixel,
the first comparison value is a comparison value between the pixel values of the first image and the second image included in the early-acquired image at the corresponding pixel positions having sensitivity to the same color, and
the second comparison value is a comparison value between the pixel values of the first image and the second image included in the late-acquired image at the corresponding pixel positions having sensitivity to the same color.

10. The image processing device according to claim 1, wherein the imaging element includes a pixel group that outputs an image signal obtained from the object image, which passes through the imaging lens, without being pupil-divided, and is formed, as the second image signal.

11. An imaging device comprising:
the image processing device according to claim 1;
an imaging element including the phase difference pixel group; and
a storage unit that stores an image which is generated on the basis of a signal output from the imaging element.

12. An image processing method using the image processing device according to claim 1 comprising:
acquiring a captured image including a first image based on a first image signal, which is obtained from an object image that passes through a pair of regions of an imaging lens, is pupil-divided, and is formed, and a second image based on a second image signal corresponding to an image signal, which is obtained from an object image that passes through the imaging lens, without being pupil-divided, and is formed, the first image signal and the second image signal being output from an imaging element including a phase difference pixel group that outputs the first image signal;
calculating a shading characteristic correction coefficient on the basis of a first comparison result between the first image and the second image included in an early-acquired image which is acquired first of a pair of captured images acquired at different times and a second comparison result between the first image and the second image included in a late-acquired image which is acquired later than the early-acquired image of the pair of captured images;
correcting shading characteristics of the late-acquired image on the basis of the calculated shading characteristic correction coefficient; and
directing a display unit that displays an image to continuously display the second image included in the early-acquired image and the second image included in the late-acquired image, of which the shading characteristics have been corrected, as a moving image, and to continuously display an image based on the first image included in the early-acquired image and an image based on the first image included in the late-acquired image, of which the shading characteristics have been corrected, as a moving image for checking a focus in a display region of the second image.

13. A non-transitory computer readable recording medium recorded with an image processing program that causes a computer to function as the image processing device according to claim 1 comprising:

acquiring a captured image including a first image based on a first image signal, which is obtained from an object image that passes through a pair of regions of an imaging lens, is pupil-divided, and is formed, and a second image based on a second image signal corresponding to an image signal, which is obtained from an object image that passes through the imaging lens, without being pupil-divided, and is formed, the first image signal and the second image signal being output from an imaging element including a phase difference pixel group that outputs the first image signal;

calculating a shading characteristic correction coefficient on the basis of a first comparison result between the first image and the second image included in an early-acquired image which is acquired first of a pair of captured images acquired at different times and a second comparison result between the first image and the second image included in a late-acquired image which is acquired later than the early-acquired image of the pair of captured images;

correcting shading characteristics of the late-acquired image on the basis of the calculated shading characteristic correction coefficient; and directing a display unit that displays an image to continuously display the second image included in the early-acquired image and the second image included in the late-acquired image, of which the shading characteristics have been corrected, as a moving image, and to continuously display an image based on the first image included in the early-acquired image and an image based on the first image included in the late-acquired image, of which the shading characteristics have been corrected, as a moving image for checking a focus in a display region of the second image.

14. An image processing device comprising:

an acquisition unit that acquires a captured image including a first image based on a first image signal, which is obtained from an object image that passes through a pair of regions of an imaging lens, is pupil-divided, and is formed, and a second image based on a second image signal corresponding to an image signal, which is obtained from an object image that passes through the imaging lens, without being pupil-divided, and is formed, the first image signal and the second image signal being output from an imaging element including a phase difference pixel group that outputs the first image signal;

a correction unit that calculates a shading characteristic correction coefficient on the basis of a first comparison result between the first image and the second image included in an early-acquired image which is acquired first of a pair of captured images acquired at different times by the acquisition unit and a second comparison result between the first image and the second image included in a late-acquired image which is acquired later than the early-acquired image of the pair of captured images, and corrects shading characteristics of the late-acquired image on the basis of the calculated shading characteristic correction coefficient;

a display unit that displays an image; and a control unit that directs the display unit to continuously display an image based on the first image included in the early-acquired image and an image based on the first image included in the late-acquired image, of which the shading characteristics have been corrected by the correction unit, as a moving image for checking a focus.

15. The image processing device according to claim 14, wherein the shading characteristic correction coefficient is obtained by averaging the first comparison result and the second comparison result.

16. The image processing device according to claim 15, wherein the shading characteristic correction coefficient is obtained by averaging the first comparison result to which a first weight is given and the second comparison result to which a second weight that is less than the first weight is given.

17. The image processing device according to claim 15, wherein the shading characteristic correction coefficient is obtained by averaging the first comparison result to which a first weight is given and the second comparison result to which a second weight that is equal to or greater than the first weight is given.

18. The image processing device according to claim 14, wherein the first comparison result is a value that is based on a first comparison value between pixel values of the first image and the second image included in the early-acquired image at corresponding pixel positions, and the second comparison result is a value that is based on a second comparison value between pixel values of the first image and the second image included in the late-acquired image at corresponding pixel positions.

19. An image processing method comprising the image processing device according to claim 14:

acquiring a captured image including a first image based on a first image signal, which is obtained from an object image that passes through a pair of regions of an imaging lens, is pupil-divided, and is formed, and a second image based on a second image signal corresponding to an image signal, which is obtained from an object image that passes through the imaging lens, without being pupil-divided, and is formed, the first image signal and the second image signal being output from an imaging element including a phase difference pixel group that outputs the first image signal;

calculating a shading characteristic correction coefficient on the basis of a first comparison result between the first image and the second image included in an early-acquired image which is acquired first of a pair of captured images acquired at different times and a second comparison result between the first image and the second image included in a late-acquired image which is acquired later than the early-acquired image of the pair of captured images;

correcting shading characteristics of the late-acquired image on the basis of the calculated shading characteristic correction coefficient; and directing a display unit that displays an image to continuously display an image based on the first image included in the early-acquired image and an image based on the first image included in the late-acquired image, of which the shading characteristics have been corrected, as a moving image for checking a focus.

20. A non-transitory computer readable recording medium recorded with an image processing program that causes a computer to function as the image processing device according to claim 14 comprising:

acquiring a captured image including a first image based on a first image signal, which is obtained from an object image that passes through a pair of regions of an imaging lens, is pupil-divided, and is formed, and a second image based on a second image signal corresponding to an image signal, which is obtained from an object image that passes through the imaging lens, without being pupil-divided, and is formed, the first image signal and the second image signal being output from an imaging element including a phase difference pixel group that outputs the first image signal;

calculating a shading characteristic correction coefficient on the basis of a first comparison result between the first image and the second image included in an early-acquired image which is acquired first of a pair of captured images acquired at different times and a second comparison result between the first image and the second image included in a late-acquired image which is acquired later than the early-acquired image of the pair of captured images;

correcting shading characteristics of the late-acquired image on the basis of the calculated shading characteristic correction coefficient; and directing a display unit that displays an image to continuously display an image based on the first image included in the early-acquired image and an image based on the first image included in the late-acquired image, of which the shading characteristics have been corrected, as a moving image for checking a focus.

* * * * *